United States Patent [19]
Honey et al.

[11] Patent Number: 5,953,077
[45] Date of Patent: Sep. 14, 1999

[54] SYSTEM FOR DISPLAYING AN OBJECT THAT IS NOT VISIBLE TO A CAMERA

[75] Inventors: Stanley K. Honey, Palo Alto; Richard H. Cavallaro, Mountain View; Terence J. O'Brien, San Jose; Timothy P. Heidmann, Los Altos; Patrick W. Olsen, Sunnyvale; James R. Gloudemans, San Mateo, all of Calif.

[73] Assignee: Fox Sports Productions, Inc., Los Angeles, Calif.

[21] Appl. No.: 08/785,205

[22] Filed: Jan. 17, 1997

[51] Int. Cl.⁶ ........................................ H04N 7/18
[52] U.S. Cl. ............................. 348/589; 348/600
[58] Field of Search .................... 348/571, 578, 348/584, 589, 598, 600, 601

[56] References Cited

U.S. PATENT DOCUMENTS

| | | | |
|---|---|---|---|
| 3,351,347 | 11/1967 | Smith et al. | 473/199 |
| 3,580,993 | 5/1971 | Sandorf et al. | 178/6 |
| 3,840,669 | 10/1974 | Bowerman | 178/6.8 |
| 3,851,303 | 11/1974 | Muller | 340/27 |
| 3,944,738 | 3/1976 | Johnson | 178/7.2 |
| 3,945,716 | 3/1976 | Kinder | 350/174 |
| 3,949,490 | 4/1976 | Derderian et al. | 35/12 |
| 3,973,239 | 8/1976 | Kakumoto et al. | 340/146.3 |
| 4,057,782 | 11/1977 | Muller | 340/27 |
| 4,064,528 | 12/1977 | Bowerman | 348/578 |
| 4,067,015 | 1/1978 | Mogavero et al. | 343/225 |
| 4,084,184 | 4/1978 | Crain | 358/93 |
| 4,179,704 | 12/1979 | Moore et al. | 348/579 |
| 4,183,536 | 1/1980 | Platt | 273/128 |
| 4,261,647 | 4/1981 | Ellis | 350/174 |
| 4,319,266 | 3/1982 | Bannister | 358/22 |
| 4,380,024 | 4/1983 | Olofsson | 358/93 |
| 4,386,363 | 5/1983 | Morrison | 358/22 |
| 4,390,950 | 6/1983 | Muller | 364/434 |
| 4,407,564 | 10/1983 | Ellis | 350/174 |
| 4,420,770 | 12/1983 | Rahman | 358/183 |
| 4,490,741 | 12/1984 | Hornback | 358/152 |
| 4,521,196 | 6/1985 | Briard et al. | 434/20 |

(List continued on next page.)

FOREIGN PATENT DOCUMENTS

| | | |
|---|---|---|
| 41 01 156 A1 | 1/1991 | Germany. |
| 1659078 A1 | 6/1991 | U.S.S.R.. |
| WO 95/10915 | 4/1995 | WIPO. |
| WO 95/10919 | 4/1995 | WIPO. |

OTHER PUBLICATIONS

Replay 2000—The Ultimate Workstation for Sport Commentators and Producers, Orand Hi–TecSystems, Apr. 1995.
SailTrack, GPS Tracking System for Animated Graphics Broadcast Coverage of the America's Cup Races, 1992.
SailTrack Technical Overview, 1992.
Sail Viz Software Documentation, 1992.

*Primary Examiner*—Bryan Tung
*Attorney, Agent, or Firm*—Fliesler, Dubb, Meyer & Lovejoy LLP

[57] ABSTRACT

A system for enhancing the television presentation of an object that can display the object even if the object is not visible to a camera. The system determines whether the object is visible to the camera broadcasting the event. If the object is not visible to the camera, the video image captured by the camera is edited to show the object, not show the object or enhance the video in a different manner. The object is placed in the captured video image at the position the object would be in the camera's field of view if there was no barrier between the object and the camera.

36 Claims, 18 Drawing Sheets

U.S. PATENT DOCUMENTS

| | | | |
|---|---|---|---|
| 4,541,013 | 9/1985 | Alpert | 358/142 |
| 4,582,389 | 4/1986 | Wood et al. | 350/3.69 |
| 4,591,897 | 5/1986 | Edelson | 358/22 |
| 4,612,666 | 9/1986 | King | 382/32 |
| 4,613,200 | 9/1986 | Hartman | 350/3.7 |
| 4,647,969 | 3/1987 | Graham, Sr. | 358/142 |
| 4,669,810 | 6/1987 | Wood | 350/3.7 |
| 4,674,125 | 6/1987 | Carlson et al. | 382/49 |
| 4,700,306 | 10/1987 | Wallmander | 701/207 |
| 4,739,406 | 4/1988 | Morton et al. | 358/183 |
| 4,763,990 | 8/1988 | Wood | 350/320 |
| 4,775,218 | 10/1988 | Wood et al. | 350/174 |
| 4,811,084 | 3/1989 | Belmares-Sarabia et al. | 358/22 |
| 4,817,171 | 3/1989 | Stentiford | 382/19 |
| 4,846,475 | 7/1989 | Newcomb et al. | 273/128 |
| 4,847,603 | 7/1989 | Blanchard | 340/705 |
| 4,878,054 | 10/1989 | Reynaud | 340/975 |
| 4,892,386 | 1/1990 | Suzuki et al. | 350/174 |
| 4,897,726 | 1/1990 | Morton et al. | 358/183 |
| 4,924,507 | 5/1990 | Chao et al. | 382/31 |
| 4,950,050 | 8/1990 | Pernick et al. | 350/162.13 |
| 4,957,297 | 9/1990 | Newcomb et al. | 273/213 |
| 4,968,036 | 11/1990 | Von Der Mark | 273/128 R |
| 4,970,666 | 11/1990 | Welsh et al. | 345/423 |
| 4,975,770 | 12/1990 | Troxell | 358/96 |
| 4,995,090 | 2/1991 | Singh et al. | 382/50 |
| 4,999,709 | 3/1991 | Yamazaki et al. | 358/160 |
| 5,034,732 | 7/1991 | Iino | 340/705 |
| 5,060,282 | 10/1991 | Molley | 382/42 |
| 5,063,603 | 11/1991 | Burt | 382/37 |
| 5,082,263 | 1/1992 | Berger | 473/467 |
| 5,142,590 | 8/1992 | Carpenter et al. | 382/14 |
| 5,149,096 | 9/1992 | Keating et al. | 273/128 R |
| 5,150,895 | 9/1992 | Berger | 273/29 R |
| 5,179,421 | 1/1993 | Parker et al. | 356/152 |
| 5,184,820 | 2/1993 | Keating et al. | 273/128 R |
| 5,207,720 | 5/1993 | Sheperd | 273/128 R |
| 5,241,616 | 8/1993 | Garcia | 385/126 |
| 5,245,432 | 9/1993 | Jaffray et al. | 358/160 |
| 5,249,039 | 9/1993 | Chaplin | 358/22 |
| 5,264,933 | 11/1993 | Rosser et al. | 348/578 |
| 5,268,734 | 12/1993 | Parker et al. | 356/152 |
| 5,274,716 | 12/1993 | Mitsuoka et al. | 382/31 |
| 5,305,107 | 4/1994 | Gale et al. | 548/590 |
| 5,313,304 | 5/1994 | Chaplin | 348/587 |
| 5,340,108 | 8/1994 | Gerpheide et al. | 473/156 |
| 5,346,210 | 9/1994 | Utke et al. | 273/55 R |
| 5,353,392 | 10/1994 | Luquet et al. | 395/135 |
| 5,388,825 | 2/1995 | Myers et al. | 273/58 G |
| 5,392,088 | 2/1995 | Abe et al. | 396/79 |
| 5,394,203 | 2/1995 | Murphy et al. | 353/13 |
| 5,398,075 | 3/1995 | Freytag et al. | 348/590 |
| 5,413,345 | 5/1995 | Nauck | 473/156 |
| 5,414,439 | 5/1995 | Groves et al. | 345/7 |
| 5,419,562 | 5/1995 | Cromarty | 273/183.1 |
| 5,419,565 | 5/1995 | Gordon et al. | 273/374 |
| 5,423,549 | 6/1995 | Englmeier | 273/213 |
| 5,436,672 | 7/1995 | Medioni et al. | 348/591 |
| 5,459,793 | 10/1995 | Naoi et al. | 382/165 |
| 5,465,144 | 11/1995 | Parker et al. | 356/139.06 |
| 5,465,308 | 11/1995 | Hutcheson et al. | 382/159 |
| 5,469,512 | 11/1995 | Fujita et al. | 382/118 |
| 5,469,536 | 11/1995 | Blank | 345/431 |
| 5,488,675 | 1/1996 | Hanna | 382/284 |
| 5,491,517 | 2/1996 | Kreitman et al. | 348/581 |
| 5,498,000 | 3/1996 | Cuneo | 273/354 |
| 5,508,737 | 4/1996 | Lang | 348/159 |
| 5,513,854 | 5/1996 | Daver | 273/454 |
| 5,524,065 | 6/1996 | Yagasaki | 382/226 |
| 5,543,856 | 8/1996 | Rosser et al. | 348/578 |
| 5,549,259 | 8/1996 | Herlik | 244/136 |
| 5,563,620 | 10/1996 | Terai | 345/7 |
| 5,564,698 | 10/1996 | Honey | 273/128 R |
| 5,566,251 | 10/1996 | Hanna et al. | 382/284 |
| 5,592,236 | 1/1997 | Rosenbaum et al. | 348/586 |
| 5,610,653 | 3/1997 | Abecassis | 348/110 |
| 5,627,915 | 5/1997 | Rosser et al. | 382/219 |
| 5,668,629 | 9/1997 | Parker et al. | 356/139.05 |
| 5,677,532 | 10/1997 | Duncan et al. | 250/339.15 |
| 5,808,695 | 9/1998 | Rosser et al. | 348/584 |

SEE FIG. 4A

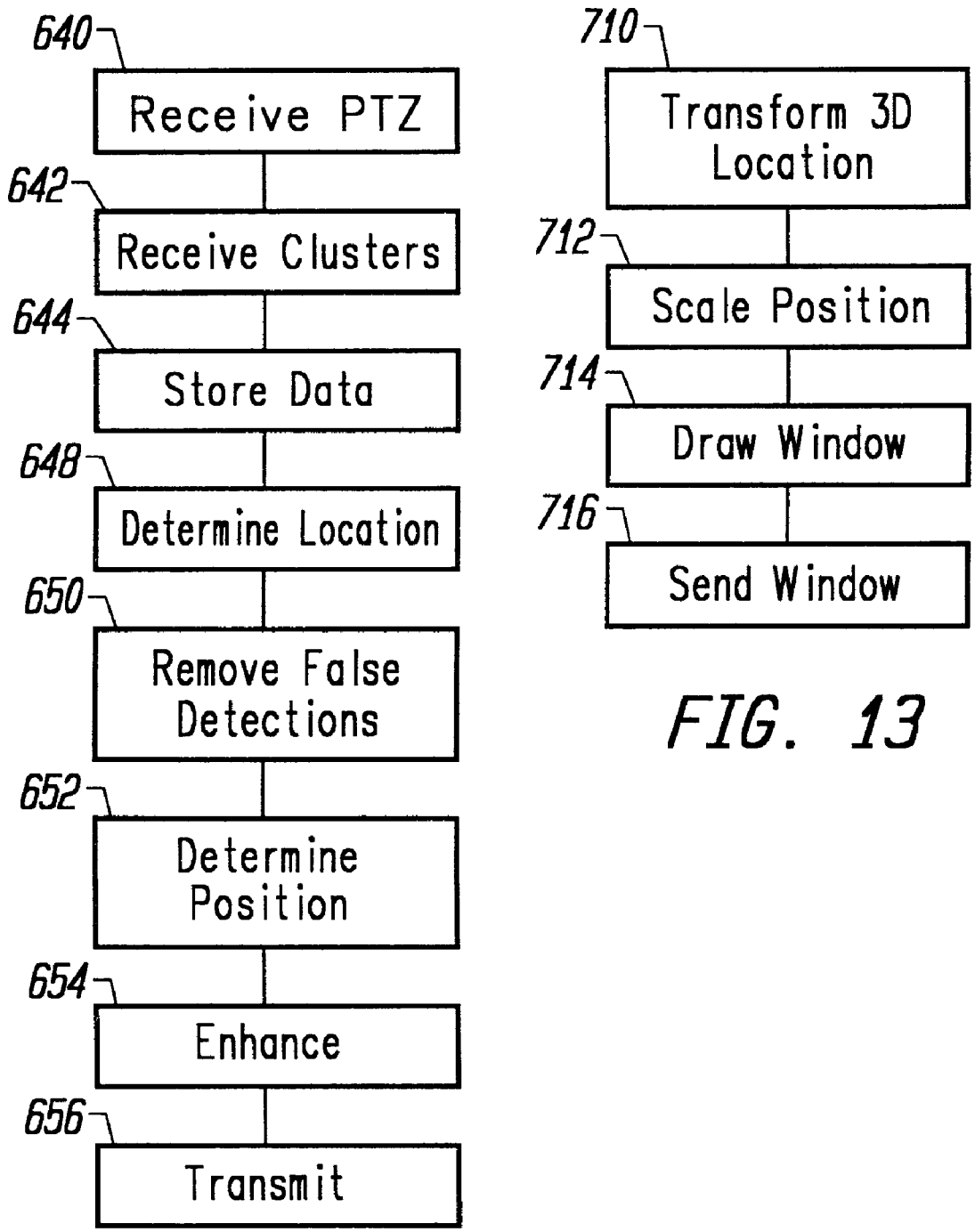

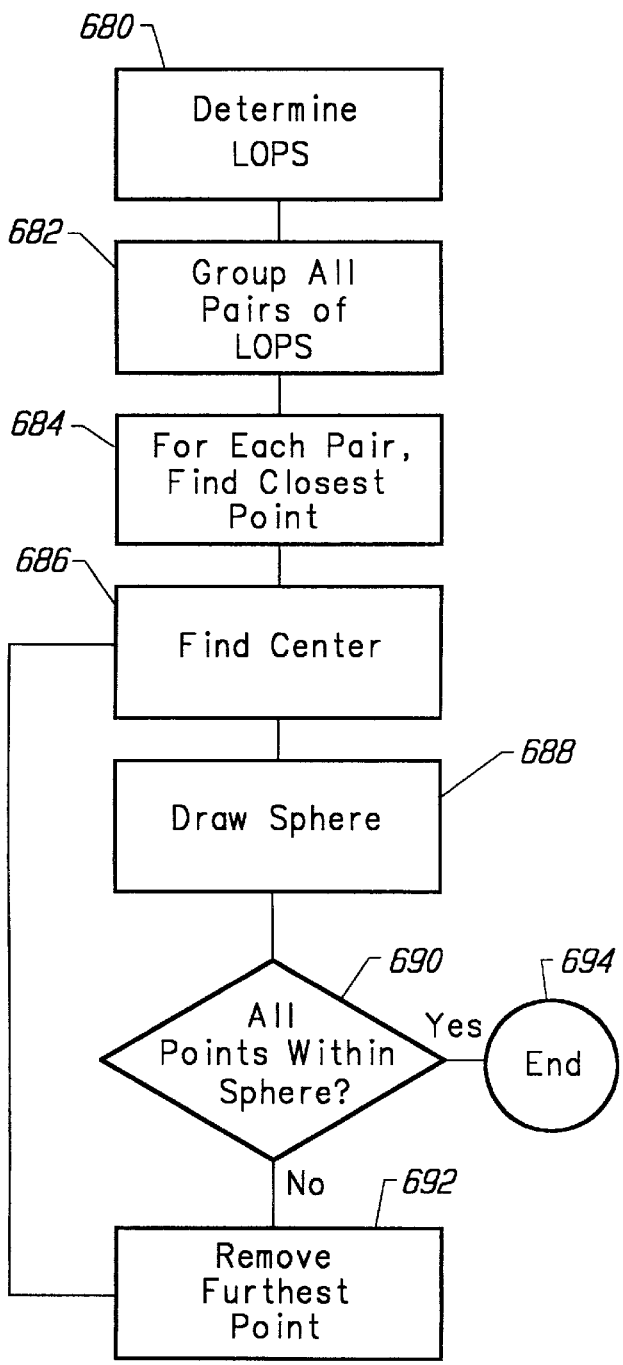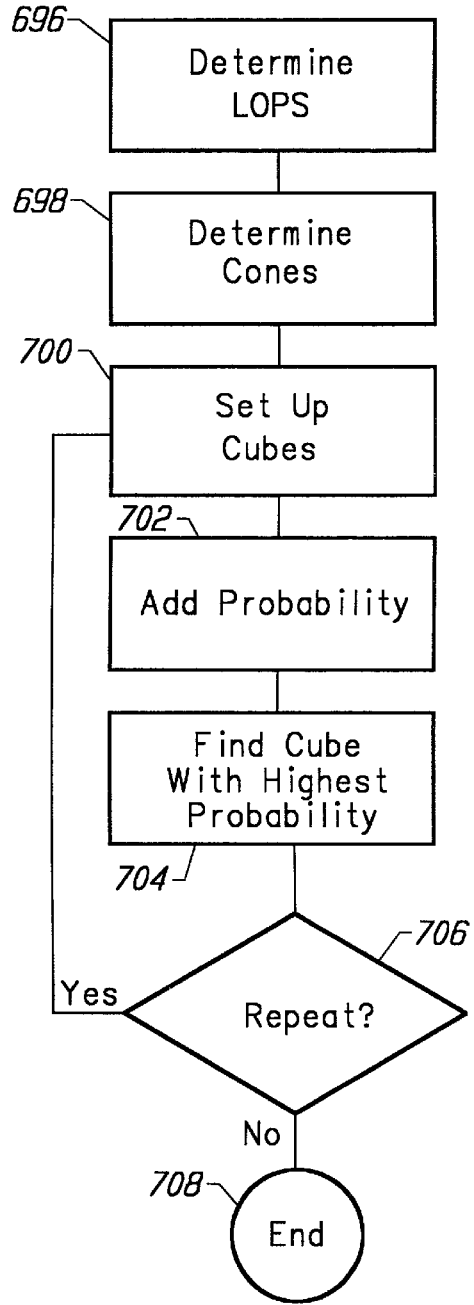
FIG. 12A
FIG. 12B

SYSTEM FOR DISPLAYING AN OBJECT THAT IS NOT VISIBLE TO A CAMERA

BACKGROUND OF THE INVENTION

1. Field of the Invention

The present invention is directed to a system for enhancing a video presentation of an object such that the object can be displayed even if it is not visible to a camera.

2. Description of the Related Art

Because of the size and speed of some objects and the distance of the television camera from the playing field, some objects at a sporting event are hard to see on a television screen. One example of an object at a sporting event is the game object, which is defined as the article or thing which is the focus of the game, for example, a hockey puck, baseball, football, soccer ball, shotput, basketball, tennis ball, etc. To compensate for objects that are hard to see on television, broadcasters will use zoom lenses. However, the limited field of view of a zoomed camera prevents the object from being viewed in relation to the playing field and prevents the viewer from seeing other objects that are part of the sporting event. Additionally, even with zoom lenses some objects remain difficult to see on television.

For example, television viewing of a hockey game is hampered by poor visibility and distortion of the hockey puck. The puck is small, and is passed, shot and deflected at high speeds. A standard hockey puck is three inches in diameter and one inch high. A television viewer sees only a limited portion of the ice and the scene being viewed changes rapidly as the camera moves to follow the action. In order to be able to view all areas of the hockey rink, cameras must be located far from the playing surface. Thus, on a standard television screen a hockey puck tends to appear as a small dot or a smear, and sometimes the puck is not perceptible by a viewer. As a result, it is difficult to follow the puck from player to player, and it is especially difficult to follow the puck as it is shot toward the goal. For most viewers, recognizing that a goal has been scored probably comes after the fact when a signal light is turned on or the announcer informs the viewer that a goal has been scored. Because viewers cannot follow the puck, they do not sustain interest in the game. Although hockey is a popular sport, telecasts of hockey games would have wider appeal and be more fully enjoyed if the movement of the puck could be more closely followed.

In golf and baseball it is hard to see the ball when the ball is hit in the air for a long distance (e.g. a home run in baseball or a tee shot in golf). To compensate, cameras will zoom in on the baseball or golf ball which allows the viewers to see the ball against the sky. Such a view of the ball does not give the viewer a true perspective of the ball's path. That is, the viewer cannot determine how far the ball was hit or where the ball is in the relation to the playing field. At times a viewer of a baseball game cannot distinguish between a home run and a routine fly ball. One way to show a baseball or a golf ball in relation to the playing field is to zoom out and show the entire baseball field or golf course. However, such a zoom-out will make the ball difficult or impossible to see. Other sporting events present similar visibility problems.

Another problem with televising sporting events (or other live events) is that there are times when an object of interest is visible to people at the event but not visible to a camera. For example, it is common for a hockey puck to be on the ice next to the boards surrounding the ice. If a camera is located behind the boards, as they usually are, then the boards will block the camera's view of the puck and a television viewer will not be able to see the puck. Other sporting events (and other live events) present similar visibility problems.

Thus, there is a need for enhancing the television presentation of objects at a sporting event such that an object can be displayed even if it is not visible to a camera.

SUMMARY OF THE INVENTION

The present invention is directed to overcome the disadvantages of the prior art. Thus, the present invention provides for a system for enhancing the presentation of an object by accounting for circumstances when an object is not visible to a camera.

The system, roughly described, determines if a target is visible to a camera and edits a first video image captured by said camera to show the target if the target is not visible to the camera. Another embodiment includes determining a position of the target in the camera's field of view and adding an image to a video frame captured by the camera at a position in the video frame logically corresponding to the position of the target in the field of view of the camera, regardless of whether the target is visible to the camera. In one alternative, after it is determined that the target is not visible to the camera, the system may decide not to edit the video or not to modify any enhancement used.

Many different technologies known in the art can be used to determine the position of the target's image in a manner suitable for the present invention. One example of such a system would include the use of pattern recognition. Other examples use radar, infrared tracking, and/or other sensors in conjunction with other suitable hardware.

These and other advantages of the invention will appear more clearly from the following detailed description in which the preferred embodiment of the invention has been set forth in conjunction with the drawings.

BRIEF DESCRIPTION OF THE DRAWINGS

FIG. 11 is a flow chart describing some of the operation of the graphics center and production center.

FIGS. 12A and 12B are flow charts describing two exemplar methods for determining the puck's three dimensional location.

FIG. 13 is a flow chart describing the determination of the puck's position in a video frame and one alternative for enhancing the television presentation of the hockey puck.

DETAILED DESCRIPTION

The present invention can be used in conjunction with many different live events. For example purposes, the embodiment described below is used in conjunction with the broadcast of an ice hockey game. Furthermore, many different technologies can be used to track an object. The examples below use systems employing infrared technology and/or radar to track an object; however, many other suitable technologies can also be used with the current invention.

I. Infrared System

A. Infrared Transmitting Puck

Figure 1:
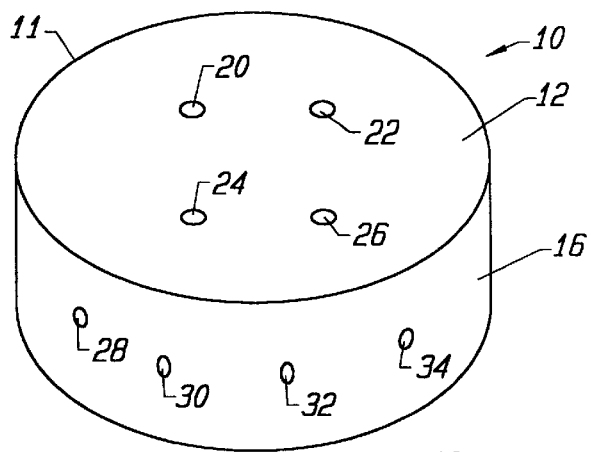
FIG. 1 depicts a perspective view of a hockey puck according to the present invention.

Conventional hockey pucks are black, cylindrically shaped, 1" thick with a 3" inch diameter, 5½–6 ounces and made of vulcanized rubber. One example of a hockey puck according to the present invention is shown in FIG. 1 and designated generally by the reference numeral 10. Hockey puck 10 is made in accord with conventional specifications and further includes an electromagnetic transmitter. In one embodiment, the electromagnetic transmitter includes infrared emitting diodes. Preferably (although not required), the tip of the diode is sliced off so that the diode can be flush with the surface of the puck and the angular emission of the infrared (IR) beam will be increased. As will be discussed below, alternatives to infrared emitters includes RF transmitters, radar repeaters and other devices which emit electromagnetic waves outside the visible spectrum.

Electromagnetic waves include light, radio, X-rays, gamma rays, microwave, infrared, ultraviolet and others, all involving the propagation of electric and magnetic fields through space. The difference between the various types of electromagnetic waves are in their frequency or wavelength. The human eye is sensitive to electromagnetic radiation of wavelengths from approximately 400 to 700 nm, the range called light, visible light or the visible spectrum. Thus, the phrase "electromagnetic signal not visible to a human eye" means an electromagnetic signal outside of the visible spectrum. It is important that the signal transmitted by the hockey puck is not visible to the human eye so that the visual appearance of the puck will not be altered.

Puck 10 is comprised of a rubber body member 11 having a flat top surface 12, a flat bottom surface 14 (shown in FIG. 3) and a side surface or outer circumference 16. At the top surface are shown four infrared emitting diodes 20, 22, 24 and 26, which are fitted in bores in the puck. The bottom surface also has four infrared emitting diodes. Because of the point of view, FIG. 1 only shows four infrared emitting diodes 28, 30, 32 and 34 along outer circumference 16. The preferred hockey puck includes twelve infrared emitting diodes along outer circumference 16, spaced apart at 30° intervals. By the phrase "along an outer circumference" it is meant that the diodes are generally spaced at or near the outer circumference. For example, the diodes can be recessed (e.g. ⅟₁₆") from the circumference and still be "along the outer circumference." If the diodes are recessed from the circumference, then there may be an indent in the surface of the puck in front of the diode. As an option, the indent could be filled with an infrared transparent epoxy or other filling material which would not change the elasticity or color of the puck. Alternatively, a lens could be placed in front of the diode.

Figure 2:
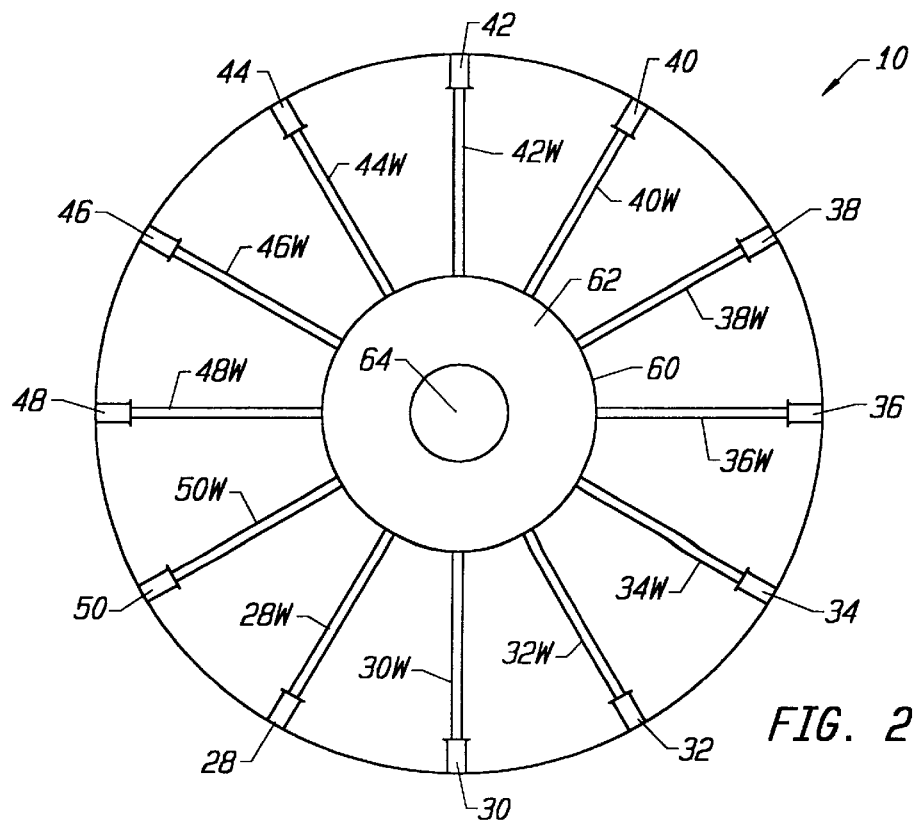
FIG. 2 depicts a cut-away plan view of the hockey puck of FIG. 1.

FIG. 2 shows a cutaway plan view of puck 10. All twelve diodes (28, 30, 32, 34, 36, 38, 40, 42, 44, 46, 48 and 50) along outer circumference 16 can be seen. Each diode is housed in a bore approximately the size of the diode. Inside of the puck is a recess 60 which receives printed circuit board 62. Mounted on printed circuit board 62 are electronics and a battery 64. Wires 28w, 30w, 32w, 34w, 36w, 38w, 40w, 42w, 44w, 46w, 48w and 50w run from printed circuit board 62 to the diodes. Battery 64 can be more than one battery vertically stacked in the center of printed circuit board 62. The battery is a lithium battery which handles cold temperatures well and has high current capability. It is important that the electronics operate sufficiently under cold temperatures because hockey pucks are traditionally frozen prior to use during a hockey game. High current capability is also important so that the infrared emitting diodes can be driven with the high current to maximize the intensity of the infrared signal. Battery 64, printed circuit board 62 and the infrared emitting diodes are held in place using filler materials (microspheres) and a flexible epoxy, for example, DP190 by 3M. Additionally, any gaps in recess 60 not occupied by the electronics could be filled with epoxy to help secure the electronics and to maintain the pucks hardness and elasticity.

Figure 3:
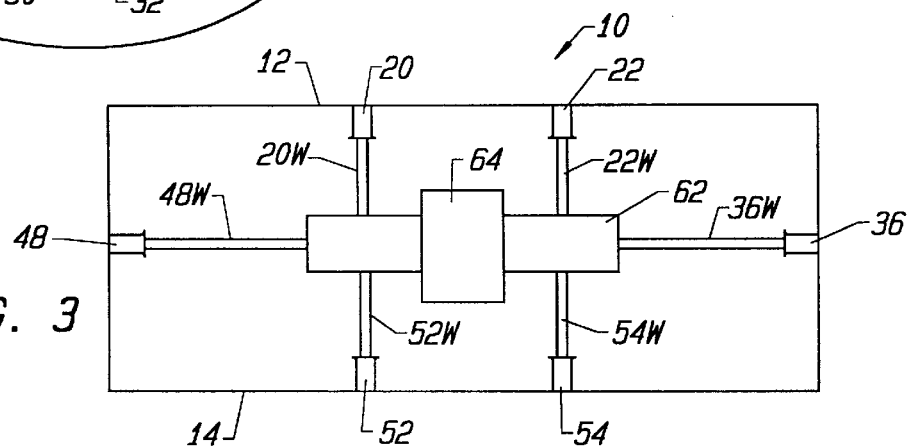
FIG. 3 depicts a cross-sectional view of the hockey puck of FIG. 1.

FIG. 3 is a side cut-away view of hockey puck 10 showing bottom surface 14, diodes 52 and 54 on the bottom surface and the wires (20w, 22w, 52w and 54w). As discussed above, there are four diodes along the flat lower surface of the preferred embodiment hockey puck 10. It is clear from FIGS. 2 and 3 that the components of the electromagnetic transmitter are completely disposed inside rubber body member 11. Being "completely disposed inside the rubber body member" means that the electromagnetic transmitter does not protrude outside the puck's perimeter, this includes abutting or being flush with the perimeter of rubber body member 11.

Figure 4A:
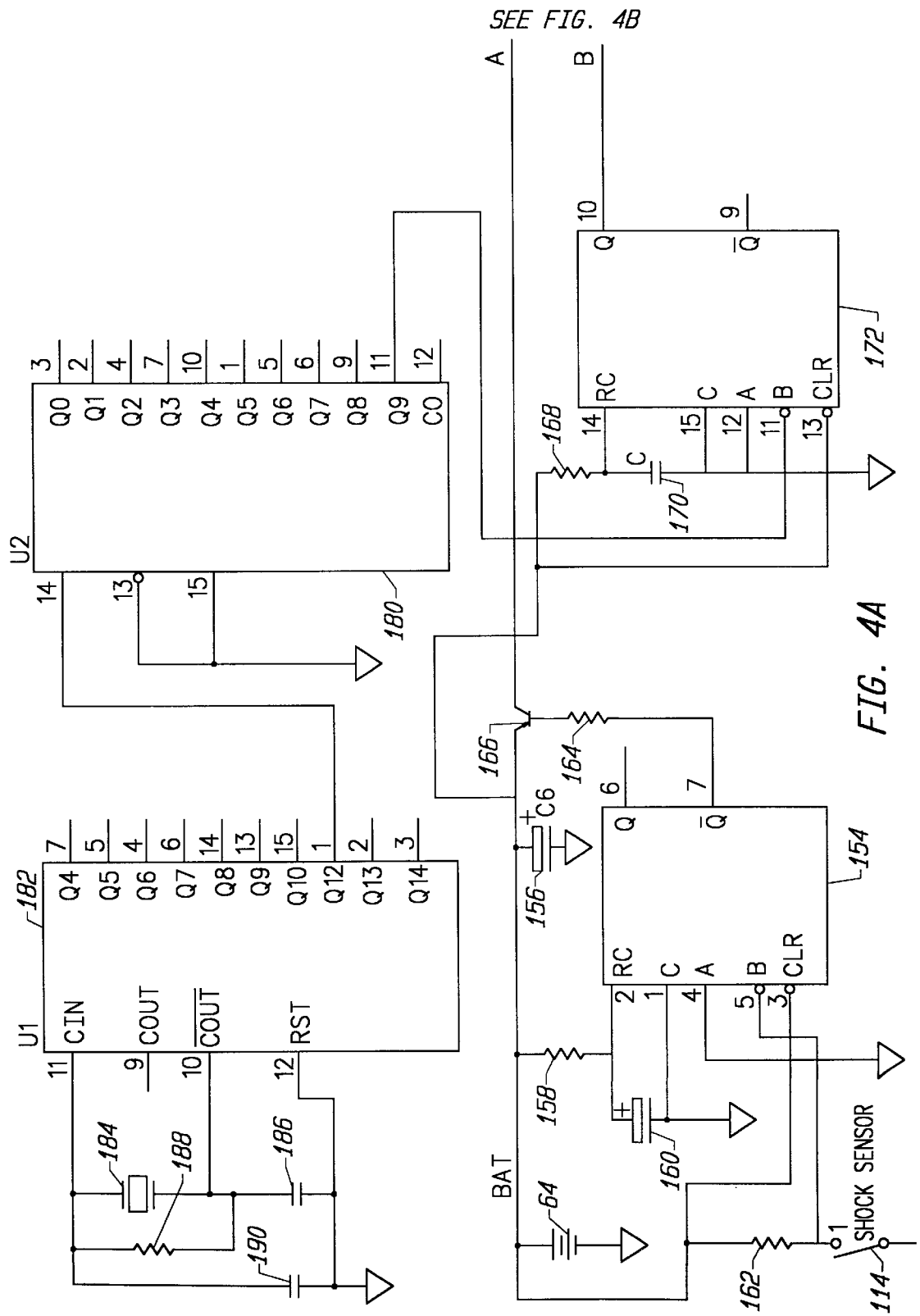
FIGS. 4A and 4B shows an electronics package for the hockey puck of FIG. 1.
Figure 4B:
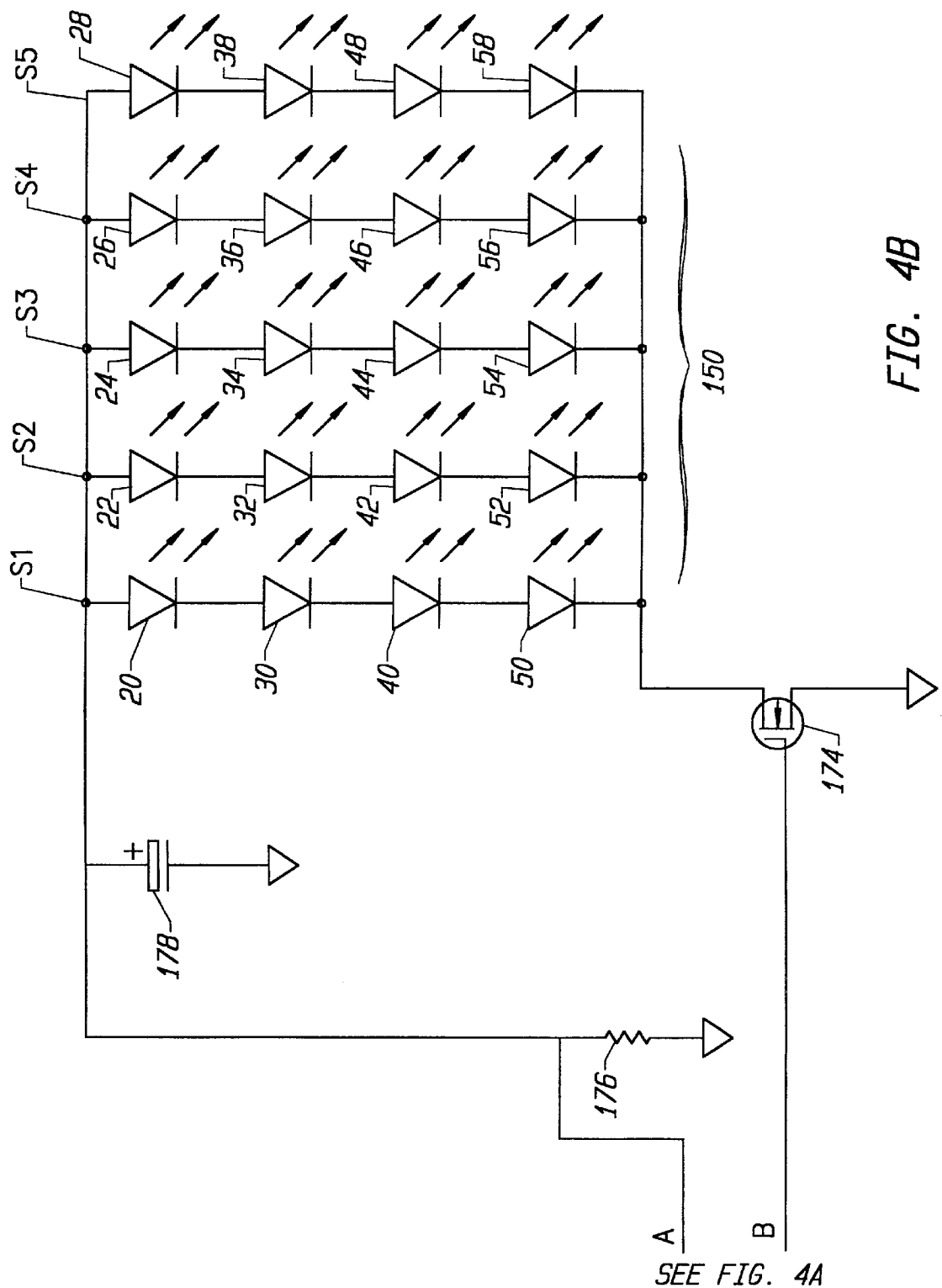

FIGS. 4A and 4B are schematic diagrams of one alternative electronics package for hockey puck 10. The infrared emitting diodes 20–58 are shown as five strings of diodes (S1–S5). Each string includes four diodes connected in series. The five strings are connected to each other in parallel. Thus, if one diode fails, all of the diodes on the particular string will turn off; however, the other four strings of diodes will remain functional. In accord with this arrangement, the diodes from the various strings are interleaved throughout the puck. That is, the diodes of one string are not located next to each other. Rather, the diodes are mixed. Looking at FIG. 2, each diode is located next to a diode from another string. For example, diode 30 (which is on string S1) is between diode 28 (which is on string S5) and diode 32 (which is on string S2). This arrangement prevents the situation where one diode breaks and the entire side of the puck stops transmitting.

Although the electronics package uses twenty diodes, it is possible that the puck can be constructed and will function with more or fewer than twenty diodes. One diode by itself will produce a signal that can be detected; however, it is advantageous to have more than one diode so that the angle of the puck and location of the puck in regard to other objects will not significantly affect reception of the signal transmitted from the puck. Additional diodes also maximizes the output of the transmitters. One diode that can be used with the current invention is a GaAlAs infrared emitter SFH485-2, manufactured by Siemens. The SFH485-2 is an infrared emitting diode which emits radiation in the near infrared range (880 nm peak). Other infrared emitting diodes can be used including an infrared laser diode or any other source which transmits an infrared signal. The infrared emitting diodes are used in the disclosed embodiment to emit an electromagnetic wave with a wavelength at or near 880 nm. During operation, the diodes are pulsed. The advantages of pulsing the diodes are to extend battery life, to increase the infrared signal (e.g. run at one amp instead of one hundred milli-amps during the pulse), to improve the signal to clutter ratio by matching the sensor shuttering to the diodes pulse and to allow for subtraction which is discussed below.

Battery 64 is made up of four 3 volt lithium batteries stacked near the center of PC board 62. FIG. 4A shows timing and control circuits 154 and 172, which are Motorola MC 4538 dual precision re-triggerable/re-setable monostable multi-vibrators that can be triggered from either edge of an input pulse and produce an accurate output interval over a wide range of widths. Timing and control circuit 154 is used to detect a pulse from shock sensor 114, turn on the pulsing of the diodes and automatically turn off the pulsing of the diodes after a predetermined period of time. Preferably, the diodes are turned off after 45 seconds. This prolongs the life of the battery, allows testing and prevents pucks not in use from transmitting. Connected to the RC input of timing and control circuit 154 is resistor 158 and capacitor 160, both used for timing purposes. The Q output of timing and control circuit 154 is connected, across resistor 164, to the base of transistor 166. The A input of timing and control circuit 154 is connected to ground. The B input is connected to shock sensor 114 and to the bottom of resistor 162. The clear pin of timing and control circuit 154 is connected to the top of the resistor 162, battery 64, the top of resistor 158, capacitor 156 and the emitter of transistor 166. Capacitor 156 is also connected to ground.

Shock sensor 114 is used to turn on the circuit when it senses a shock. In one embodiment, shock sensor 114 includes a wire suspended inside a brass or copper tube. The wire is attached to a cap with epoxy or other insulating material which acts to suspend the wire inside the tube in a cantilevered fashion and insulate the wire. When shock sensor 114 is shocked (e.g. puck is jolted or hit) the wire bends and touches the tube which, for a brief moment, completes the circuit. Timing and control circuit 154 includes an edge detector which senses an edge (the circuit being closed) and turns on the puck.

The clear pin of timer control circuit 172 is connected to the emitter of transistor 166 and the top of resistor 168. The RC input of a timer control 162 is connected to the bottom of resistor of 168 and to capacitor 170. The C input of timing and control 172 is connected to capacitor 170, the A input, and ground. The Q output of timing and control circuit 172 is connected to FET 174. The B input of timing and control circuit 172 is connected to the Q9 output of Divide by 10 circuit 180 (divides frequency by ten). The clock input to Divide by 10 circuit 180 is connected to the Q12 output of Divide by 16 circuit 182 (divides frequency by 16). The enable and reset pins of Divide by 10 circuit 180 are grounded. The reset pin of Divide by 16 circuit 182 is connected to capacitor 190, capacitor 186 and ground. The $\overline{\text{COUT}}$ pin of Divide by 16 circuit 182 is connected to the bottom of resistor 188, capacitor 186 and to resonator 184. Resonator 184 is a CSB1228J ceramic resonator by Murata. Resonator 184 can be mounted on printed circuit board 62 or suspended, inside the puck, within an epoxy or other material to prevent damage to the resonator from shock. The CIN pin of Divide by 16 circuit 182 is connected to resonator 184, the top of the resistor of 188 and to capacitor 190.

FET 174 is connected to infrared emitting diodes 50, 52, 54, 56 and 58. The circuit will produce five amps of current to pass through diode bank 150. Because the diodes are divided into five strings which are connected in parallel, each string receives approximately one amp. Because each string includes four diodes connected in series, each diode will receive approximately one amp of current. The collector of transistor 166 is connected to the top of resistor 176, capacitor 178, diode 20, diode 22, diode 24, diode 26 and diode 28. Capacitor 178 and the bottom of resistor 176 are connected to ground.

Figure 6:
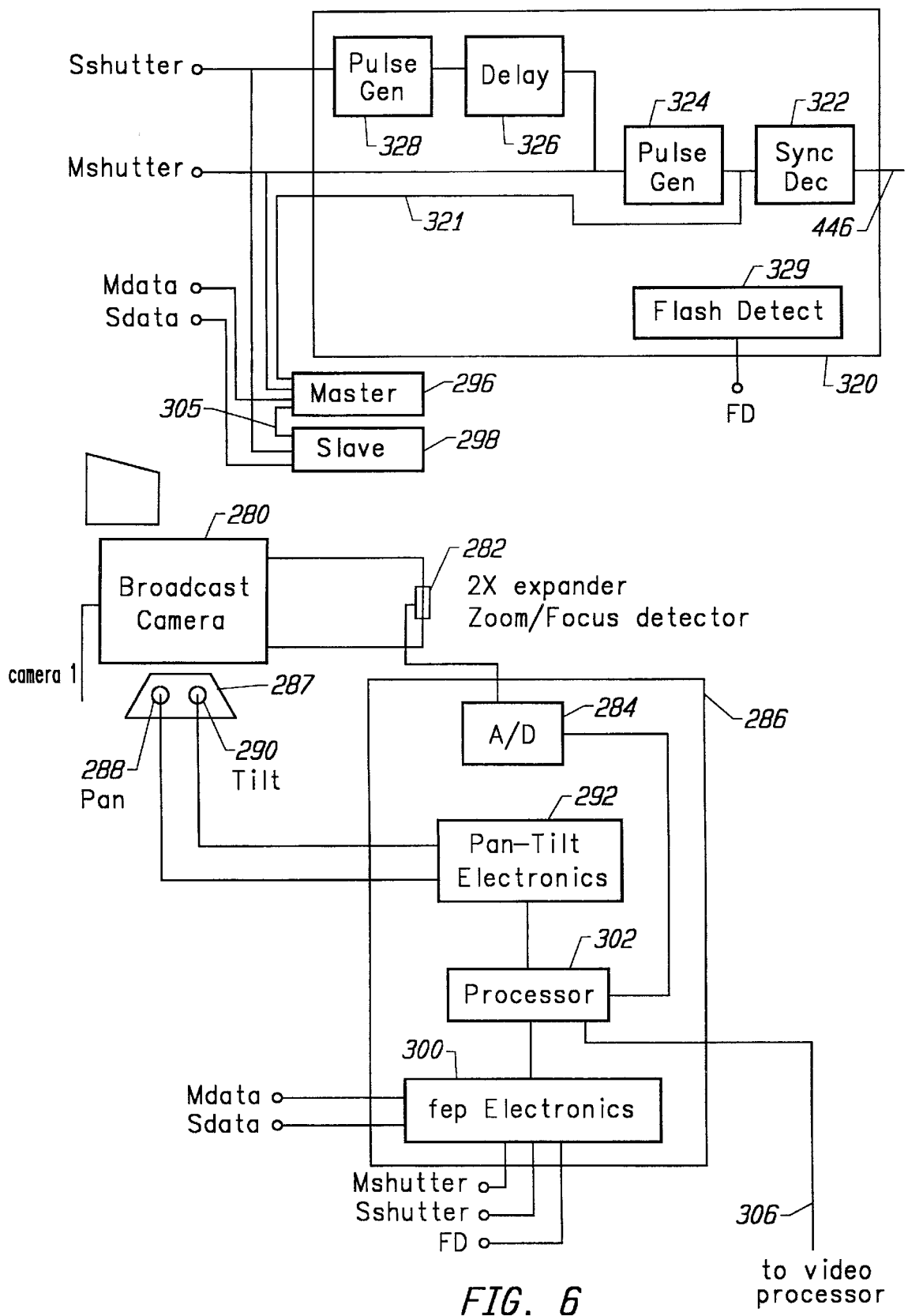
FIG. 6 is a block diagram of a camera location for the system of FIG. 5.

The circuit of FIG. 6 provides for pulses of nominally 140 μsec at a rate of approximately 29.75–29.95 Hz. Those skilled in the art can modify the circuit to change the duration or frequency of the pulses. The pulses begin when the shock sensor is shocked. The pulses end 45 seconds after the last shock. If the shock sensor receives a shock while the puck is pulsing, the 45 second clock is reset. A shock sensor is only one of many alternatives to insure that the puck is on during play. It is anticipated that the shock to the puck when the referee drops the puck for a face off, a players hits the puck with a stick or the puck hits the boards will provide the shock necessary to trigger the circuit. While in play the puck should be hit by a player's stick or the boards at least once every 45 seconds. During the course of a game pucks are hit out of play. That is, a shot by a player goes over the boards and into the seating area. At that point it is desirable that the puck turn off. Thus, the timer is used to turn the puck off 45 seconds after the last shock. This prevents the arena from being filled with pucks continuously on.

There are at least four approaches to manufacturing a puck in accordance with the present invention. First, the electronics can be supported in an injection mold and vulcanized rubber can be injected around it. Second, the device can be in a pre-loaded package that is molded into a puck. Third, pucks can be molded into two halves with a recess in each half so that the electronics can be fitted in the combined recess when the two halves are assembled together. Fourth, existing conventional pucks could be machined into separate pieces and reassembled with the electronics package (retrofitting). In one embodiment of the fourth approach, half of two pucks would be sliced away. A recess would be carved into the remaining two halves as well as bores for each of the diodes. There is also a need to carve a very thin passage to house the leads from the electronics to the diodes. The inventors envision various other manufacturing options that are compatible with the present invention.

B. System Overview

Puck 10 is used with a system that includes one or more sensors which can be used to detect the location of the puck in three dimensional space and/or the position of the puck in a video frame. An infrared sensor can determine the angle or direction of the puck from the sensor using techniques known in the art. Two or more infrared sensors can be used to determine the three dimensional location of the puck. The three dimensional location of the puck can be used, in conjunction with the broadcast camera's location, orientation and field of view to locate the puck in the video frame and enhance the television presentation of the puck.

Figure 5:
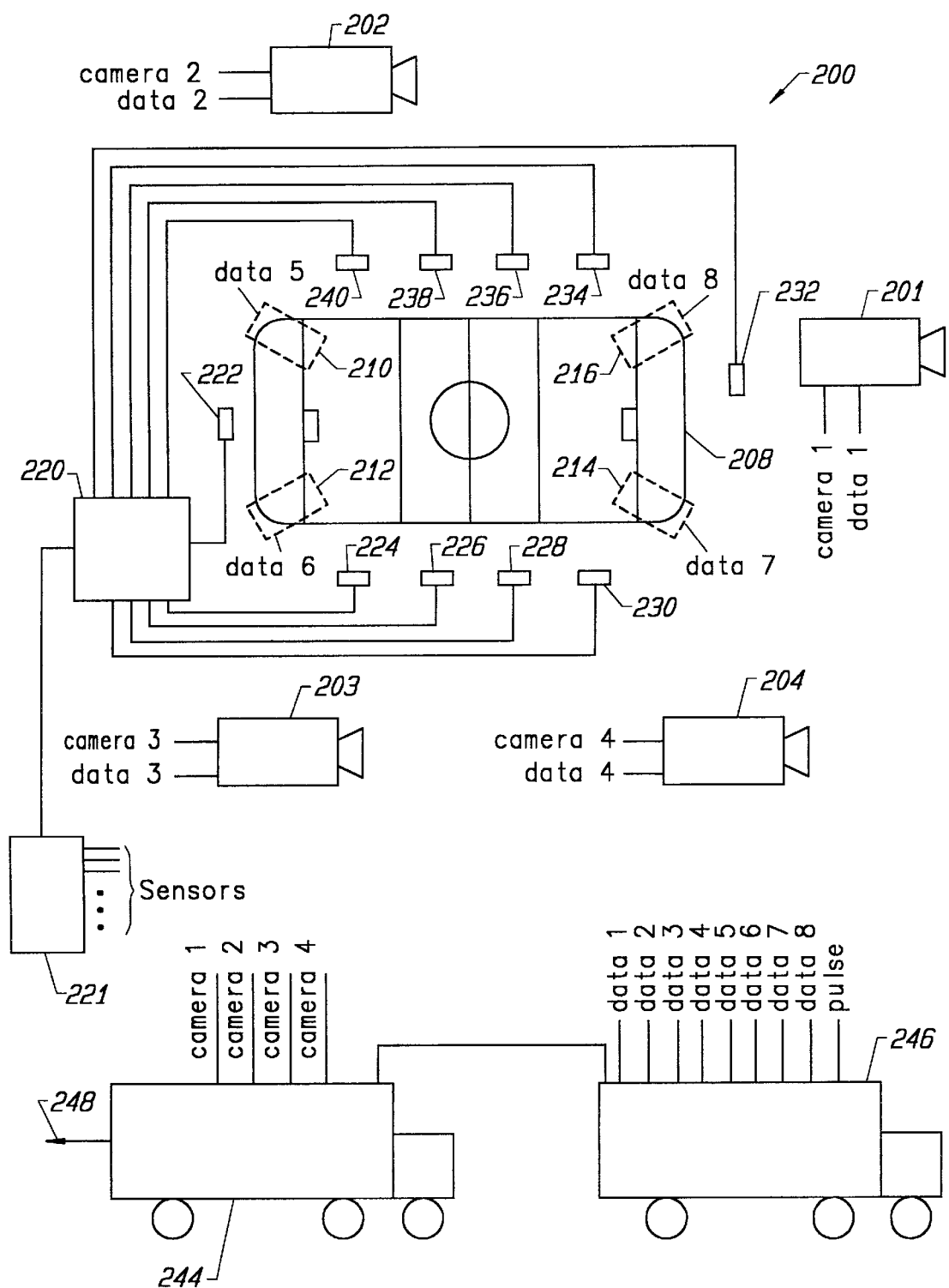
FIG. 5 is a block diagram of a system used for enhancing the television presentation of the hockey puck of FIG. 1.

FIG. 5 depicts system 200, which is one embodiment of a system that can be used to enhance the video presentation of puck 10 with the electronics package depicted in FIGS. 4A and 4B. Variations of system 200 can be used to enhance the video presentation of targets other than a puck. For example, other targets that can be enhanced are advertisements, playing fields, other moving objects, etc. System 200 includes four camera locations 201, 202, 203 and 204. It is possible for system 200 to function with only one camera location; however, to provide a viewer with multiple angles of view it is desired to have up to four or more camera locations. The various camera locations can be located anywhere in the arena suitable for capturing video images of puck 10 in hockey rink 208. Each camera location includes a broadcast camera and communicates with graphics center 246. By communicating it is meant that the camera location sends a signal to the graphics center directly or indirectly. As shown, signal data 1 transmits data between camera location 201 and graphics center 246, signal data 2 transmits data between camera location 202 and graphics center 246, signal data 3 transmits data between camera location 203 and graphics center 246 and signal data four transmits data between camera location 204 and graphics center 246. In one embodiment, graphics center 246 includes computers and video equipment housed in a truck.

The camera locations also communicate with a television production center 244. The signal camera 1 indicates communication between camera location 201 and production center 244, camera 2 indicates communication between camera location 202 and production center 244, camera 3 indicates communication between camera location 203 and production center 244, and signal camera 4 indicates communication between camera location 204 and production center 244. In one embodiment, the television production center is a truck including various video and audio equipment. Both the graphics center 246 and the video production center 244 can exist in various forms and can be located in various locations that can maintain the communications with the camera locations and sensors as described below.

System 200 includes one or more infrared sensors. The number of sensors used depends on cost and desired accuracy. In one embodiment 8–10 sensors are used. In other embodiments, as little as one sensor can be used. To ease setup, wiring and maintenance, as well as increase the chance that the puck will be in the field of view of an infrared sensor, one or more infrared sensors are located at the camera location. However, locating infrared sensors at the camera locations is optional. The sensors at the camera location communicate with graphics center 246 via data 1, data 2, data 3 and data 4. System 200 also includes additional sensor locations, 210, 212, 214 and 216, which are not located at the camera locations. The signal data 5 indicates communication between infrared sensor location 210 and graphics center 246. The signal data 6 indicates communication between infrared sensor location 212 and graphics center 246. The signal data 7 indicates communication between infrared sensor location 214 and graphics center 246. The signal data 8 indicates communication between infrared sensor location 216 and graphics center 246. If the system used 10 sensors, there would be two more sensor locations.

System 200 also includes collector box 220 which is connected to pulse detectors 222, 224, 226, 228, 230, 232, 234, 236, 238 and 240. The pulse detectors are used to detect when puck 10 is pulsing on so that the infrared sensors will open their shutter in synchronization with the puck's pulses. In one embodiment, the pulse detectors include a photo detector, which includes a photo diode and op-amp. A system that uses a puck which continuously transmits an infrared signal would not need pulse detectors. In one option, the pulse detectors can be located at the top of the glass which surrounds the ice. Alternatively, the pulse detectors are mounted from the ceiling of the arena, mounted at other suitable locations in the arena, or some combination of the above.

Collector box 220 is connected to synchronizer processor 221. Some embodiments of the current system use additional pulse detectors that are connected to an additional collector box. Additional collector boxes could also be connected to synchronizer processor 221. For example, to increase coverage or redundancy, it may be desired to have two collector boxes, with each collector box being connected to ten pulse detectors. All ten pulse detectors can be mounted to the roof of the arena or placed in other suitable locations.

Synchronizer processor 221 sends a control signal and a 30 Hz reference signal to collector box 220 (and any other collector boxes). Synchronizer processor 221 receives a data signal back from collector box 220. Additionally, synchronizer processor 221 sends a composite synchronization signal (discussed below) to each of the infrared sensors.

Collector box 220 includes a computer, a multi-channel time-interval-analyzer interface card, a 24 bit digital I/O card, and a two-channel isolated RS-422 serial communications interface. Also included is a power/signal interface for ten pulse detectors, a signal gate for each individual pulse detector, and a pulse status display for each pulse detector. Each of the pulse detectors will send a signal to collector box 220 to indicate that it has detected a pulse. Collector box 220 measures the time occurrence of each pulse detector output signal relative to the 30 Hz reference signal. Collector box 220 measures the time of each pulse whether it is caused by a puck pulse, a strobe flash (described below), fluorescent light pulse, or some other detected pulse. For each pulse detector, an average maximum pulse rate of 150 Hz (5 pulses per pulse detector per 33.33 ms period) is tolerated and all pulses after the first five pulses (on average) for that pulse detector in a 33.33 ms period are dropped. The timing is reported to 1 $\mu$sec resolution. Each pulse is described by a 16 bit unsigned integer word representing relative timing over the 33.33 ms period. Thus, the collector box determines how long after the beginning of the period of the 30 Hz reference signal a pulse was received from each pulse detector. This information is included in the data signal sent from the collector box 220 to synchronizer processor 221.

Synchronizer processor 221 receives the data from one or more collector boxes in order to extract a repeatable pulse train with a frequency of, in this case, 29.85 Hz+/−0.10 Hz. Interference from 60 Hz sources is identified and discarded. Synchronizer processor 221 includes a computer, a dual channel isolated RS-422 serial interface card for each collector box, a keyboard, a display monitor, a 5 channel counter/timer interface card, a synchronization interface card containing hardware for generating the 30 Hz reference signal and a camera shutter signal, an I/O card, a direct digital synthesis (DDS) card and related hardware.

Synchronization processor 221 receives data from collector box 220 about the various pulse detectors in order to identify one or more pucks. For example, synchronization processor 221 is designed to detect that the puck should be pulsing at approximately 29.85 Hz+/−0.10 Hz. Thus, synchronizer processor, with suitable software, can look for data points that repeat at that frequency. The system may find that more than one set of data fit such a rule and, thus, the system may determine that there are two pucks (or sources) being tracked. Data that does not fit into a stream of pulses at the determined frequency is discarded.

Based on the data of the pulses determined to be from the puck, the system calculates the actual frequency. Due to delays from detecting the puck's pulse and from communication to synchronizer processor 221, the computed frequency is used to predict the time of the next puck pulse in order to control the sensors' shuttering. Using the calculated frequency, synchronizer processor 221 creates a sensor shutter signal which is sent to a counter/timer on the camera/timer interface board to generate a shutter pulse to signal the infrared sensor to shutter. This pulse is also used to reset the phase of a DDS oscillator that generates an approximately 15.734 kHz horizontal drive signal. The DDS is a precise computer controlled oscillator that has the capability of external phase control. The DDS frequency is continuously adjusted to be 525 times the puck's frequency. The shutter pulse and the horizontal drive signal are combined to create the composite synchronization signal that is sent to each infrared sensor.

As discussed above, synchronizer processor 221 can track more than one source of pulses. If two sources are being tracked, the system will allow an operator to choose one of the sources as the puck. There are several ways for the operator to choose. One example includes the operator randomly choosing one of the sources as the puck and then observing how the system functions. If the system stops tracking the puck properly, then the operator can change the selection of the pulse source.

Another means for choosing among pulse sources is to have synchronizer processor 221 create a spatial coefficient which indicates the amount of movement of the source of the pulses. Synchronizer processor 221 can determine the change in the membership of the set of pulse detectors that are detecting the pulses from a particular source over time. This change can be represented as a number called a spatial coefficient. The greater the change the more likely that the source of the pulses is moving. At a hockey game, it is assumed that the instrumented puck in play is the most mobile of all infrared sources. Therefore, the operator will choose the source with the greater spatial coefficient.

In an alternative, synchronizer processor 221 or another computer can automatically choose a pulse source to be tracked using either of the two methods described above. An additional alternative includes a video processor (described below) choosing the pulse source to be tracked by determining which of the pulse sources are located in the field of play. An example of another synchronization system can be found in U.S. patent application Ser. No. 08/585,145, A System For Enhancing The Television Presentation Of An Object At A Sporting Event, filed Jan. 10, 1996, incorporated herein by reference.

C. Camera Location

FIG. 6 shows one embodiment of the camera location. Broadcast camera 280, a conventional television camera known in the art, captures a video frame which is sent to a production center 244 as shown by the signal camera 1. Broadcast camera 280 has a zoom lens including a 2× expander. Connected to broadcast camera 280 is a 2× expander/zoom/focus sensor 282 (collectively a "zoom sensor") which senses the zoom of the camera, the focal length of the camera, and whether the 2× expander is being used. The analog output of sensor 282 is sent to an analog to digital converter 284, which converts the analog signal to a digital signal and transmits the digital signal to processor 302. Broadcast camera 280 is mounted on tripod 287 which enables broadcast camera 280 to tilt and pan. Attached to tripod 287 are pan sensor 288 and tilt sensor 290, both of which are connected to pan-tilt electronics 292.

Remote processor unit 286 is a rack mounted system including analog to digital converter 284, pan-tilt electronics 292, processor 302 and front end processor electronics 300. Processor 302 is an Intel 486 microprocessor with supporting electronics; however, various other processors can be substituted. Processor 302 includes memory and, possibly, disks to store data and the software described below. In addition to being connected to the other boards in front end processor 286, processor 302 is in communication with graphics center 246, as indicated by signal 306. In one embodiment, pan sensor 288 and tilt sensor 290 are optical encoders that output a signal, measured as a number of "clicks," indicating the rotation of a shaft. Forty thousand clicks represent a full 360 degree rotation. Thus, a computer can divide the number of measured clicks by forty thousand and multiply by 360 to determine the pan or tilt angle in degrees. The pan and tilt sensors use standard technology known in the art and can be replaced by other suitable pan and tilt sensors known by those skilled in the relevant art. Pan-tilt electronics 292 receives the output of pan sensor 288 and tilt sensor 290, converts the outputs to a digital signal, representing pan and tilt, and transmits the digital signal to processor 302. The pan, tilt and zoom sensors are used to determine the field of view of the broadcast camera and, in some cases, the field of view of an infrared sensor. Thus, one or more of the pan, tilt or zoom sensors can also be labeled as a field of view sensor. For example, if the camera cannot zoom or tilt, the field of view sensor would only include a pan sensor. One alternative field of view sensor includes placing marks in various locations on the hockey rink such that each mark looks different and at least one mark will always be visible to the camera while the camera is pointed at the hockey rink. A computer using pattern recognition technology can find the mark in the video frame and, based on the mark's size and position in the video frame, determine the field of view and/or pan, tilt and zoom of the camera. Another alterative includes placing infrared emitters or beacons along the rink (e.g. on the glass). If each beacon has a unique appearance, then a computer can determine the infrared sensor's field of view based on the size of the received signal's size and location in the infrared sensor's frame of data. If an infrared sensor is mounted on a broadcast camera, determining the pan and tilt of one also determines the pan and tilt for the other (plus a known offset). Another alternative includes using pan and tilt sensors to get a rough estimate of field of view and using beacons or pattern recognition to fine tune the field of view determination.

In one embodiment, the camera location also includes an infrared sensor. One alternative includes use of two infrared sensors, master sensor 296 and slave sensor 298, both of which are connected to front end processor electronics 300 and sensor interface box 320. The system will function with only one sensor at each location. However, two sensors can be used in master and slave configuration in order to perform subtraction which will be discussed below. The disadvantage of using two sensors in master and slave configuration is the additional cost and complexities of integrating a second sensor. Master sensor 296 and slave sensor 298 are mounted near one another (e.g. next to each other) so that their optical axes are near each other. It is possible to mount the two sensors away from each other and correct for the misalignment of optical axis. In one embodiment, both sensors can be mounted on broadcast camera 280 so that they are pointed in the same direction as broadcast camera 280. This is done because it is contemplated that a camera operator will be tilting and panning broadcast camera 280 to follow the puck, and mounting the sensors on broadcast camera 280 will increase the chance that the sensors will be pointed at the puck. However, for maintenance reasons, to reduce additive errors due to compliance and platform instability, and for the convenience of the camera operator it is easier to rigidly mount the sensor at a stationary location rather than on the broadcast camera. Pan sensor 288 and tilt sensor 290 will indicate where the master and slave sensors are pointing if they are mounted on camera 280. The internal clocks of the master sensor 296 and slave sensor 298 are synchronized as indicated by signal 305.

The preferred infrared sensor is a progressive scan, full frame shutter camera, for example, the TM-9701 by Pulnix. The Pulnix sensor is a high resolution monochrome full frame shutter camera with asynchronous reset capability. The camera has an eight bit digital signal output. A narrow band infrared filter, which passes electromagnetic waves of approximately 880 nm +/-45 nm, is positioned behind the lens of the Pulnix sensor. The purpose of the filter is to block electromagnetic signals that are outside the spectrum of the signal from the puck; thus, significantly reducing background clutter.

Each sensor captures a video frame which comprises a set of pixels. Each pixel is assigned a coordinate corresponding to an X axis and a Y axis. The sensor data includes an eight bit brightness value for each pixel. The eight bit brightness values are scanned out pixel by pixel to front end processor electronics 300 from master sensor 296 via the signal Mdata and from slave sensor 298 via the signal Sdata.

Sensor interface box 320 sends the shutter command and horizontal drive to the infrared sensors. Signal 446 from the pulse detection system (described below) is decoded by sync decoder 322 to extract horizontal drive signal 321 which is communicated to master sensor 296. Horizontal drive signal 321 is used to phase lock the master sensor's internal clock to the puck. Signal 321 is also sent to pulse generator circuit 324 to produce a shutter control signal (Mshutter) at least 120 $\mu$sec wide, which is transmitted to master sensor 296. The output of pulse generator 324 is also sent to delay circuit 326 to provide a signal delayed by approximately 60 $\mu$sec for pulse generator 328. The output of pulse generator 328 (S shutter), an approximately 120 $\mu$sec wide pulse used to control the shutter, is sent to slave sensor 298. Both shutter control signals (Mshutter and Sshutter) are also sent to processor 286 for diagnostic purposes.

Many arenas do not allow photographers to use flashes on their cameras in order to prevent impairing the players' vision from random flashes. In lieu of individual camera flashes, many arenas install a set of strobe flashes at or near the ceiling of the arenas and provide for communication between each photographer's camera and the set of strobe flashes. When the photographer takes a picture, the strobe flashes emit a flash which may include energy in the infrared spectrum. In one embodiment, the system avoids incorrect data due to a sensor detecting a flash by ignoring data sensed during a flash. One means for preventing the incorrect data is to use filters. A second embodiment connects a signal from the strobe flash to the sensors or a computer which causes the system to ignore data sensed during a flash. A third embodiment includes using flash detectors. The flash detectors can be located anywhere in the arena suitable for sensing a strobe flash. For manufacturing convenience, one alternative includes a flash detector 329 as part of the sensor interface box 320. When flash detector 329 senses a flash, a signal FD is sent to front end processor electronics 300. In some environments, a flash detection system may not be necessary.

In addition to mounting sensors at the camera locations, additional sensors 210–216 are mounted throughout the arena to improve sensor coverage. Sensors 210–216 are preferably mounted above the rink with the field of view of the sensors overlapping such that each location on the ice is within the field of view of two or more sensors. Sensor locations 210, 212, 214 and 216 do not include broadcast cameras and pan/tilt/zoom detectors. Since the sensor at sensor locations 210-216 cannot pan, tilt or zoom, control system 606 (see FIG. 10) stores the location, pan, tilt and roll of the sensors. Each sensor location also includes a processor 302 and front end processor electronics 300.

Figure 7:
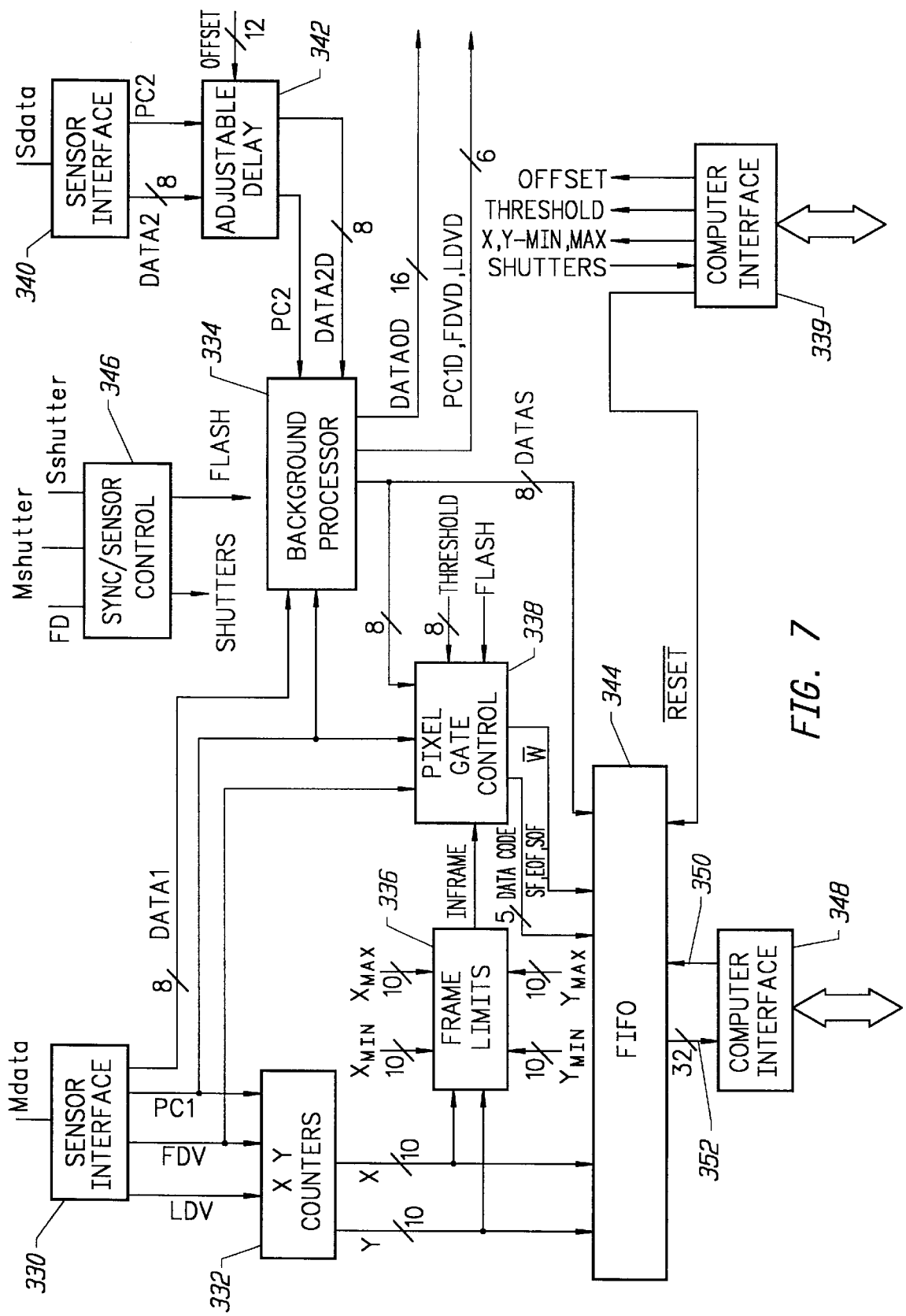
FIG. 7 is a block diagram of the front end processor electronics of FIG. 6.

FIG. 7 shows a block diagram of front end processor electronics 300. Sensor interface 330 receives data (Mdata) from master sensor 296, including the eight bit data for each pixel. Sensor interface 330 has four output signals: LDV, FDV, PC1 and DATA1. LDV (line data valid) is transmitted to XY counters 332 and indicates that a new line of valid data is being scanned out of master sensor 296. FDV (frame data valid), which is transmitted to XY counters 332 and pixel gate counter 338, indicates that valid data for the next frame is being transmitted. PC1 (pixel clock 1) is a 14.318 MHZ clock from master sensor 296 and is sent to XY counters 332, pixel gate control 338 and background processor 334. XY counters 332 counts X and Y coordinates sequentially in order to keep track of the pixel of whose data is being scanned in at the current time. When LDV is asserted, the X counter is reset. When FDV is asserted, the Y counter is reset.

As XY counters 332 sequentially count the coordinates of the pixels, frame limits 336 determines whether the coordinate of the particular pixel being scanned in is within the valid frame limits. The valid frame limits includes pixels in a rectangular box within the frame of the sensor 296 which is determined by the values of $X_{min}$, $X_{max}$, $Y_{min}$, and $Y_{max}$, all four of which are supplied from registers in processor 302 via computer interface 339. The registers in processor 302 are set by software in computer 606. (See FIG. 15.) These values can be set based on the sensor location and orientation. For example, if half of the field of view of the sensor 296 is above the hockey rink or below the hockey rink, there is no need to consider data that is not within the hockey rink. This avoids sensing spurious sources. When frame limit 336 determines that the pixel is within the valid frame limits, the signal INFRAME is asserted and transmitted to pixel gate control 338.

Sensor interface 340 receives data (Sdata) from slave sensor 298 and communicates the eight bit pixel data and PC2 (pixel clock two) to adjustable delay 342. There is no need to send a version of the signal LDV and FDV for slave sensor 298 because master 296 and slave 298 are synchronized by signal 305 (FIG. 6). Adjustable delay 342 is an adjustable shift register for aligning the optical data from the master and slave sensors. The amount of delay is determined by the variable OFFSET which is a twelve bit signal sent from processor 302 via computer interface 339. OFFSET is set in processor 300 via a user interface residing on computer 606 or a local user interface. (See FIG. 10.) The data from the two sensors needs to be optically aligned because the two sensors will be mounted on top of each other or next to each other, therefore, having different optical axes. One alternative is to use one optical axis for both sensors, for example, using a prism to transmit one image to two sensors, which in turn are optically aligned. The delayed data (PC2 and DATA2) is transmitted to background processor 334.

Background processor 334 is an Arithmetic Logic Unit with a set of registers. Alternatively, background processor 334 could be a microprocessor. Background processor 334 aligns the data based on the pixel clocks and subtracts the two sets of data (DATA1 and DATA2). There are two types of subtraction that can be used; temporal subtraction and spectral subtraction, although either or both methods can be used. The technique of temporal subtraction utilizes two sensors with similar field of views, opening their shutter at different times. The master sensor's shutter is open and captures data during an infrared pulse from puck 10. The slave sensor's shutter is open and captures data between pulses from puck 10. Therefore, master 296 and slave 298 sense substantially similar images except master sees the field of view with the puck on and slave sees almost the same field of view without the puck. If the two sets of data are subtracted, the difference should be the signal from the puck. Background processor 334 performs that subtraction. In the particular embodiment disclosed, master sensor 296 opens its shutter for 127 μsec. After master sensor 296 closes its shutter, both master and slave keep their shutters closed for 63 μsec. Subsequently, slave 298 opens its shutter for 127 μsec. followed by both shutters being closed for the remainder of the frame's 1/30 of one second. This process repeats itself approximately every 1/30 of a second based on the strobing of the puck which will be described below.

Spectral subtraction utilizes two sensors that have substantially similar field of views, but detect different spectrums. One spectrum includes the puck's pulse and the second spectrum does not. For example, master 296 would use the filter discussed above which passes wavelengths of 880 +/−45 nm. However, slave 298 would use a filter that allows a bandwidth near but not including the bandwidth of master 296. The shutters of both the master 296 and slave 298 would open and close at the same time, creating two sets of data. Theoretically, the two sets of data would differ in that one would include the puck and one would not. Subtracting the two sets of data causes most data to cancel out, except for the puck's signal. If it is decided that the subtraction techniques are not necessary, then each location needs only one sensor rather than two sensors in master/slave configuration.

The output of background processor 334 is eight bit DATAS which is sent to pixel gate control 338 and FIFO 334. Pixel gate control 338 is used to determine whether data is valid and to store that data in FIFO 334. Pixel gate control 338 uses three criteria to determine whether the data is valid. The first criteria is to determine whether the data is within the valid frame limits. The second criteria is to determine whether the data has met a certain brightness THRESHOLD. Certain pixels are so dim that they cannot be valid data. A variable THRESHOLD is used as a brightness threshold. All data with a brightness below the THRESHOLD value are thrown out. Pixel gate control 338 receives THRESHOLD from register processor 302 via computer interface 339. THRESHOLD is set from a graphical interface in computer 606 (or a local interface) based on the environment surrounding the sensors and will usually be determined by trial and error or measurement at each sensor location.

The third criteria to determine whether the data is valid is to find out whether the data was captured during a flash. When a flash is detected sync/sensor control 346 receives a signal FD indicating a flash and forwards this signal to pixel gate control 338. If pixel gate control 338 determines that the coordinates of the pixel are within the frame limit, DATAS is above the THRESHOLD and there is no flash during the frame, pixel gate control will assert W (write enable) to FIFO 334 to cause FIFO 334 to store the pixel coordinates (X,Y) from XY counters 332, a data code and eight bit DATAS. The data code indicates whether FIFO 334 is storing valid data, a strobe flash indicator (SF), an end of frame indicator (EOF) or a start of frame indicator (SOF). If the data is not within the frame limits, or not above the THRESHOLD, pixel gate control 338 will not assert W. If there is a flash during a frame, pixel gate control 338 will assert W and store SF in the data code field.

Background processor 334 also sends output signals DATA0D (16 bits), PC1D (2 bits), FDVD (2 bits), and LDVD (2 bits) to optional data monitors. DATA0D is DATAS sent as differential data. PC1D is pixel clock 1 sent as differential data. FDVD is frame data valid sent as differential data. LVDV is line data valid sent as differential data.

Computer interface 339 also transmits a reset signal to FIFO 344 to reset the FIFO when the system is being started up. Processor 302, via computer interface 348, sends a read control signal 350 to FIFO 344 in order to request data from FIFO 344. The output of FIFO 344 is a 32 bit data signal 352 that is sent to computer interface 348. Computer interface 348 aligns the data and presents the data to processor 302.

Figure 8:
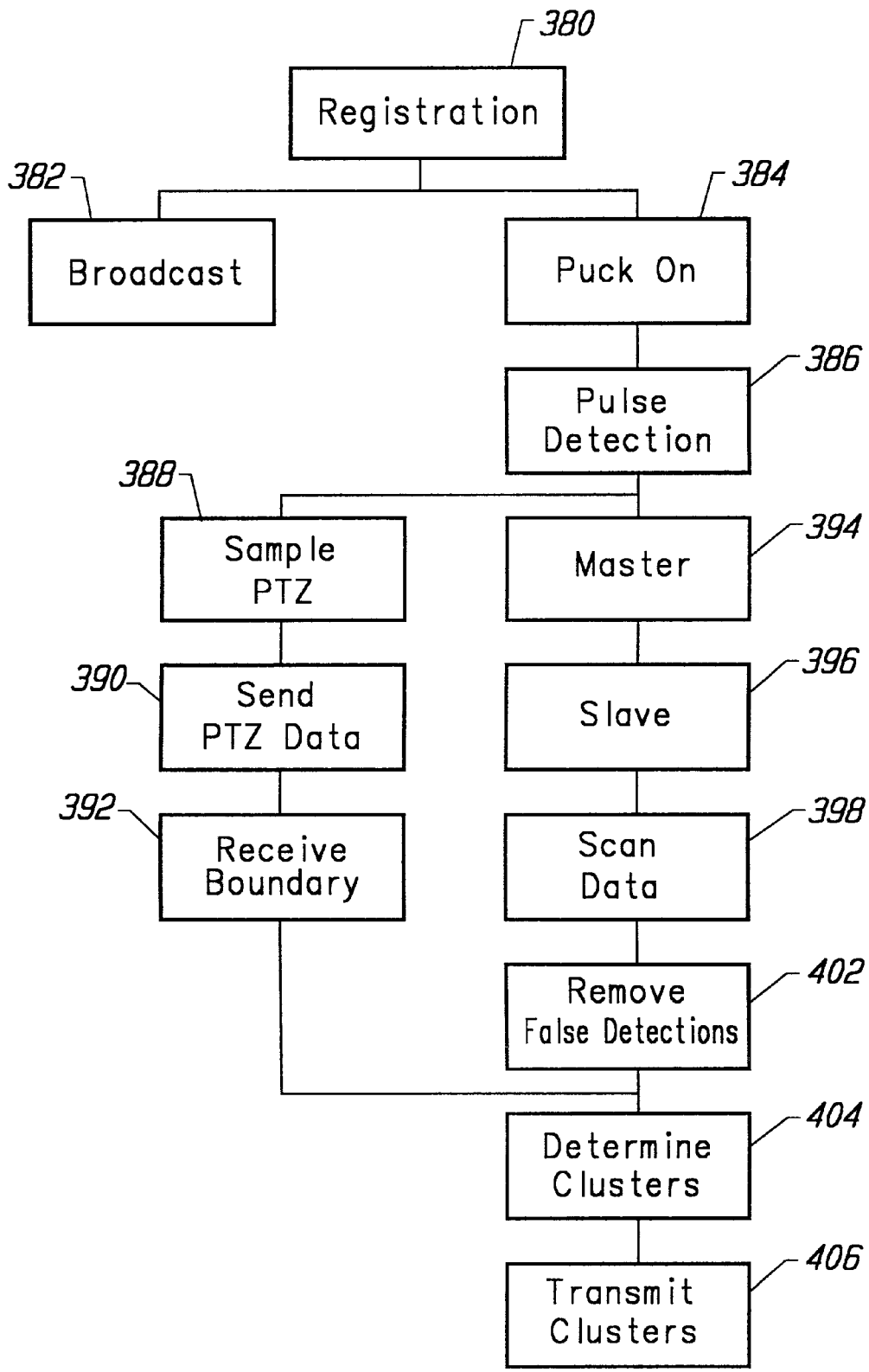
FIG. 8 is a flow chart describing some of the operations in the camera location and related hardware.

FIG. 8 describes the operations in the camera location and related hardware. The first step depicted is registration and initialization 380. This step, which will be discussed in more detail below, includes initializing and calibrating the hardware. Once normal operation begins during a television presentation, broadcast camera 280 begins selectively broadcasting the hockey game (step 382) and, concurrently, steps 384–406 are performed. By selective broadcasting it is meant that the broadcast camera captures video images and sends those images to production center 244. A manager in production center 244 may or may not use those particular video images.

In step 384, puck 10 is turned on (e.g. starts pulsing). While puck 10 is transmitting pulses, one or more pulse detectors (discussed below) detect the puck's pulses and a shutter command is sent to the infrared sensors (step 386). Although step 386 is drawn above step 388, step 386 is continuous and occurs before, after and/or during step 388. During normal operation, two sets of operations occur: steps 388–392 and steps 394–404. In step 388 analog to digital converter 284 and pan-tilt electronics 292 sample the pan, tilt and zoom values. In step 390, these values are sent to processor 302 which transmits the values to graphics center 246. In step 392, processor 302 receives the X and Y boundaries ($X_{min}$, $X_{max}$, $Y_{min}$, $Y_{max}$) from graphics center 246 and transmits those values to frame limits 336 via computer interface 339. Alternatively, the X and Y boundaries can be determined by processor 302. In step 394, master sensor 296 opens its shutter for 127 μsec and captures (or creates) data representing a position of puck 10 in the field of view of master sensor 296. In step 396, slave sensor 298 opens its shutter for 127 μsec. and captures (or creates) data. In step 398, data is serially scanned in for each pixel for both sensors. Step 398 could be divided into two separate steps. In step 402, false detections (including noise) are subtraction, brightness threshold, frame limits, flash detection, region of play filters and exclusion zones. Region of play filters and exclusion zones are discussed below. The system also utilizes pulsing, infrared filters on the sensors and infrared reduction through filtering or polarization of spurious sources for assisting the detection of the puck's signal from noise and clutter. The infrared reduction is accomplished by placing filters that remove infrared signals in front of all or some of other electromagnetic emitting sources in the arena (e.g. scoreboard). Although the system uses the above listed methods to enhance performance, a system can be designed to function without any of the listed methods or with a subset of the listed methods. After false detections are removed, valid data is stored in FIFO 344. In step 404, clusters are determined, and in step 406 cluster information is transmitted to graphics center 246.

Figure 9:
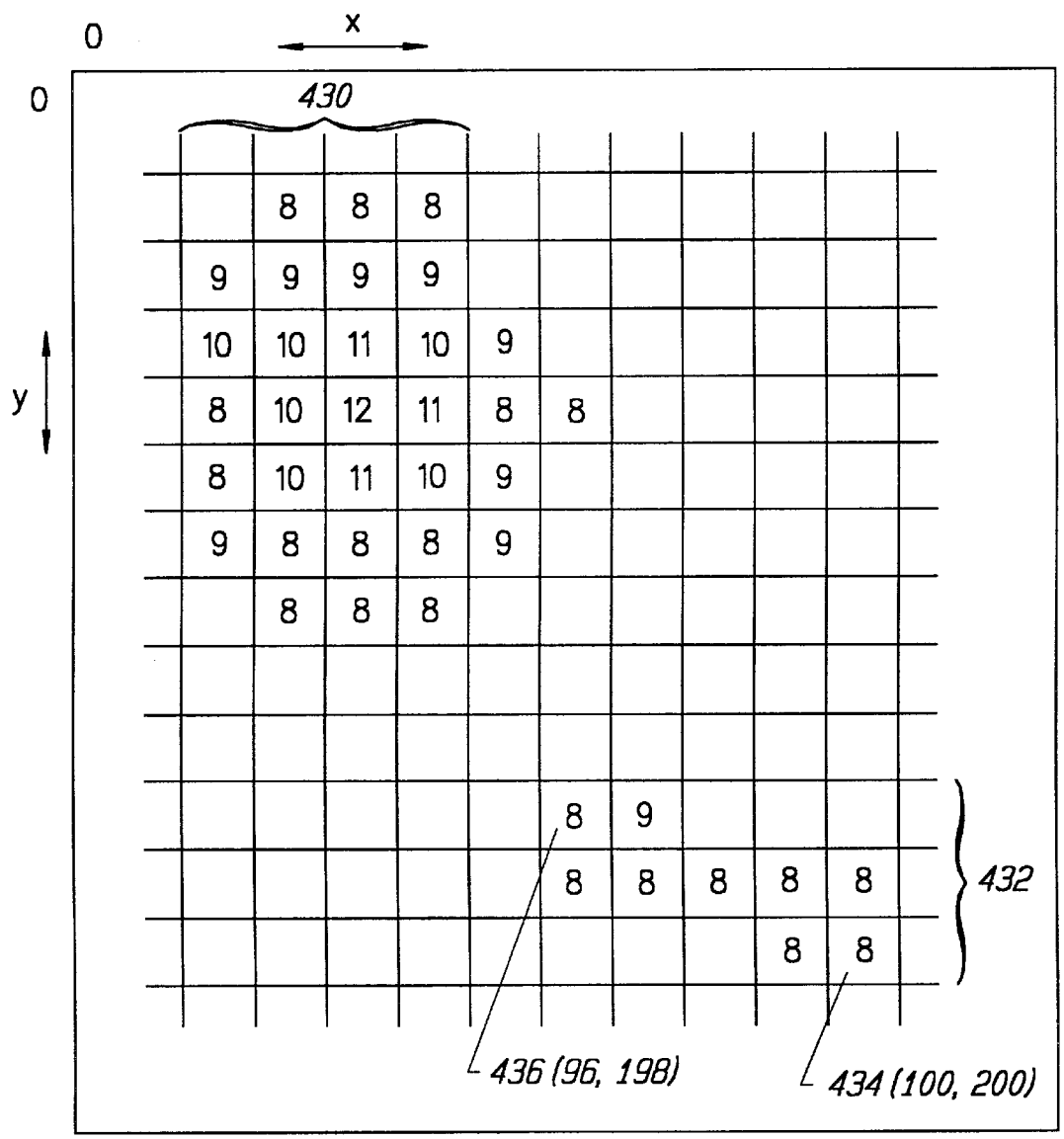
FIG. 9 is a graphical representation of data from an infrared sensor.

The data that passes the tests of step 402 tends to be represented as clusters of pixels. Thus, the system can save time transferring sensor information from the camera location to the graphics processing center 246 by sending information which characterizes the clusters instead of individual pixel values. Characterizing these clusters is the tasks performed in step 404. The advantage of clustering is that it saves bandwidth and distributes computer resources. A cluster is defined as a group of valid pixels that border each other. FIG. 9 shows a portion of a frame of data. For example purposes only, the THRESHOLD value set for this particular frame of data is eight. Thus, only pixels that have a brightness of eight counts or greater are stored in FIFO 344. Each square in FIG. 11 represents a pixel and the number in that square represents the brightness of the pixel. The pixels with no numbers have a brightness less than eight. The portion of the frame depicted includes two clusters 430 and 432. The first row of clusters 430 includes three pixels having brightness of eight. The second row of clusters 430 includes four pixels having brightness of nine. The first row of clusters 432 includes two pixels, the first pixel having a brightness of eight and the second pixel having a brightness of nine.

For each cluster, a data structure is set up analogous to a structure in the C programming language. The field of the structure would include MINX, MAXX, MINY, MAXY, TOTAL ENERGY and MAX ENERGY. MINX is the minimum X value of any of the pixels in the cluster. MAXX is the maximum X value of any of the pixels in the cluster. MINY is the minimum Y value of any of the pixels in the cluster. MAXY is the maximum Y value of any of the pixels in the cluster. Note that the X and Y values are the coordinates of pixels in the frame. For example, point 436 has the coordinates (96, 198) and point 434 has the coordinates (100, 200). TOTAL ENERGY is the sum of the brightness of all of the pixels in the cluster, and MAX energy is the brightness of the brightest pixel in the cluster. Thus, for cluster 432 MINX equals 96, MAXX equals 100, MINY equals 198, MAXY equals 200, TOTAL ENERGY equals 73, and MAX energy equals 9. In one embodiment, the system calculates an energy weighted mean for the X and Y values to approximate a single pixel location for the cluster with subpixel accuracy, rather than (or in addition to) storing the minimum and maximum values listed above.

D. Graphics Truck

Figure 10:
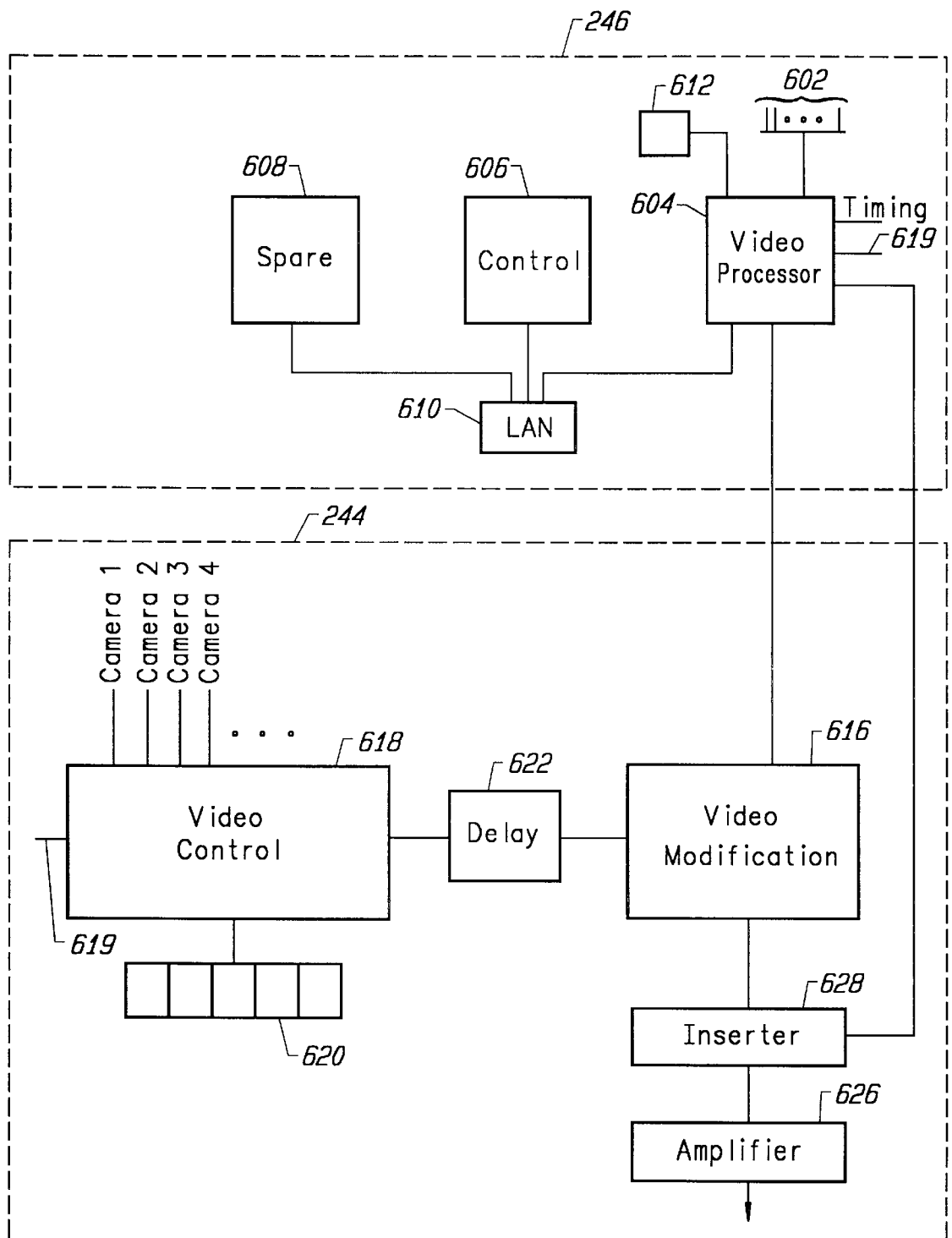
FIG. 10 is a partial block diagram of the graphics center and production center.

FIG. 10 shows a partial block diagram of graphics center 246 and production center 244. Graphics center 246 includes a video processor 604 which receives data 602 from processor 302 at each of the camera locations and infrared sensor locations. Video processor 604 performs the calculations to determine the location of the puck in the arena as well as the position of the puck in the video frame of a broadcast camera. The preferred video processor 604 is an Indigo Two Impact from Silicon Graphics. Video processor 604 receives cluster data for all of the infrared sensors and pan/tilt/zoom data for all of the broadcast cameras and saves that data in memory 612 along with timing information. The timing information is stored so that if the data is used at a later time, the processor can determine at what time the data was collected. Memory 612, in conjunction with disk drives, also stores software used to program processor 604.

Graphics center 246 also includes a control station 606 which is a second computer used as an operator interface. Control station 606 enables the operator of graphics center 246 to change variables (e.g. THRESHOLD), start the system and perform control functions. Graphics center 246 also includes a spare computer 608 which can be used in case either control station 606 or video processor 604 malfunction. Graphics center 600 can function with one computer. All three computers, 604, 606 and 608, communicate with each other over a local area network 610.

After video processor 604 determines the location of puck 10, video processor 604 determines the position of the puck in the video frame of the broadcast camera. Video processor 604 then creates data which is sent to a video modification unit 616.

Many cameras are used to televise a sporting event. The video signals from all of the cameras are sent to video control 618, which is used to select one broadcast camera for transmission to viewers. One embodiment of video control 618 includes a plurality of monitors, one monitor for each video signal, and a selection circuit. A director (or manager) would monitor the different video signals and choose which signal to broadcast. The choice will be communicated to the selection circuit which selects one camera signal to broadcast. The choice is also communicated to video processor 604. The selected video signal is also sent from video control 618 to video processor 604 and to delay 622. The output of delay 622 is transmitted to video modification unit 616. The purpose of delay 622 is to delay the broadcast video signal a fixed number of frames to allow time for video processor 604 to receive data and determine the position of the puck in the video frame. In one embodiment, the video frame needs to be delayed five frames. Although the video is delayed a small number of frames, the television signal is still defined as live. The delay introduced by the system is a small delay (under one second) which does not accumulate. That is, successive frames are continuously enhanced with the same small delay. For example, a ten frame delay is equivalent to one third of a second, which is not considered a significant delay for television.

Video modification unit 616 modifies the video signal from delay 622 with the data/signal from video processor 604. The type of modification can vary depending on the desired graphic. One exemplar implementation utilizes a keyer as video modification unit 616. When using a keyer the signal from video processor 604 to the keyer includes two signals YUV and an external key (alpha). The YUV signal is called foreground and the signal from delay 622 is called background. Based on the level of the external key, the keyer determines how much of the foreground and background to mix to determine the output signal, from 100% foreground and 0% background to 0% foreground and 100% background, on a pixel by pixel basis.

As an option, the system can also include a data inserter 628 for inserting nonvideo data into a television signal. Nonvideo data is information other than the traditional data used by a television to draw the normal scan lines on a television display. An example of nonvideo data is data transmitted during the vertical blanking interval, which can be closed caption data, statistics regarding puck 10 (e.g. the puck's location, speed, acceleration etc.), interactive queries or internet addresses. In FIG. 10, inserter 628 receives a television signal from video modification unit 616 and nonvideo data from video processor 604. Inserter 628 inserts the nonvideo data into the vertical blanking interval of the television signal and sends the resulting signal to amplifier 626.

FIG. 11 describes some of the operations in graphics center 246 and processing center 248. In step 640, the pan, tilt and zoom data is received by video processor 604 from the various processors (e.g. 302). In step 642, cluster data is received from the processors (e.g. 302). In step 644, video processor 604 stores the pan/tilt/zoom information for all broadcast cameras and the cluster data in memory 612. In step 648, video processor 604 determines the three dimensional location of puck 10. In step 650, the system removes false detections. As discussed above, there are various means for removing false detections, some of which can be performed by a processor at the graphics center. Preferably, region of play filters and exclusion zones are accomplished at the graphics center, although the inventors do contemplate performing variations of these methods at sensor locations.

Exclusion zones are known areas of false data. For example, there may be a camera with a light near the arena, or any other light near the playing surface (e.g. light indicating a penalty, timeout, etc.). It is common for these lights to emit infrared energy. Since the existence and locations of these sources are known, they can be removed from the data considered by the video processor in determining the three-dimensional location. One method for ignoring an exclusion zone is after determining the three-dimensional location of the puck, if that location is in an exclusion zone, then ignore that determination. For example, in some instances, the system determines one or more possible locations of the puck. If any of these locations are in the exclusion zone, that location is removed from consideration. Alternatively, the video processor can ignore all lines of position that pass (or substantially pass) through an exclusion zone. Another alternative includes the electronics and/or software at the sensor ignoring any cluster that would give rise to a line of position into an exclusion zone. Another alternative includes manually entering all exclusion zones for each sensor that is fixed (e.g. no pan or tilt) before the sporting event begins. This can be done at graphics center or the central location. If a sensor can pan or tilt, the processor at the sensor can be given the two or three dimensional location. Exclusion zones can also be defined in two dimensions for a camera or sensor. The exclusion zone can be manually entered at one of the processors or an operator in the production center can identify the exclusion zone using an input device (e.g. mouse) in connection with a monitor (video or sensor data).

Region of play filters are software methods for ignoring data that indicate a location outside the field of play. For example, prior to the sporting event, the system can be programmed with the three-dimensional coordinates of the hockey rink, for example, the X and Y coordinates of the hockey rink and a Z axis height limit (e.g. twenty feet). Any data indicating a location of the puck outside of these limits will be ignored.

In step 652, video processor 604 determines the puck's position in the video frame of the selected broadcast camera. In one embodiment, finding the puck's position in the video frame includes determining the field of view of the selected broadcast camera and/or determining the position of the puck in the camera's field of view. In step 654, the television presentation of the selected broadcast camera is enhanced. In one embodiment, the enhancement includes video processor 604 creating a frame of data with a graphic at the position of the puck in the video frame of the broadcast camera. The frame of data created by video processor 604 is sent to video modification unit 616 which combines the frame of data sent from video processor 604 with the frame of data from the selected broadcast camera. In step 656, the enhanced video frame is transmitted for broadcast or stored for later use.

The graphic could be a larger puck, a flashing puck, an icon, a trail of fire, an opaque cloud on top of the puck, any combination thereof, or any other graphic which highlights the video presentation of the puck. The graphic could also be logically near the position of the puck, for example, a trail of fire behind the puck, a trajectory of the puck's path, a target at the end of the pucks trajectory, an arrow pointing to the puck, etc. The enhancement could also include audio data, for example, a sound related to the speed or acceleration of the puck, or a sound indicating that the puck is at a certain location. Other examples of enhancements includes nonvideo data; statistics displayed on the television related to the puck's position, location, speed, acceleration, etc. The step of enhancing includes combining data (e.g. a keyer), editing data and creating data.

In performing the steps of sensing infrared data, capturing video and enhancing a video frame, error can be introduced due to distortion in the broadcast camera's lens and/or the sensor's lens. It is possible to ignore the distortion and live with the error. If the error is unacceptable, the distortion of a lens can be mapped. Then, when using data from a sensor or when placing a graphic, the system can interpolate between error measurements at several fixed distortion map data points in order to reduce error.

Figure 16:
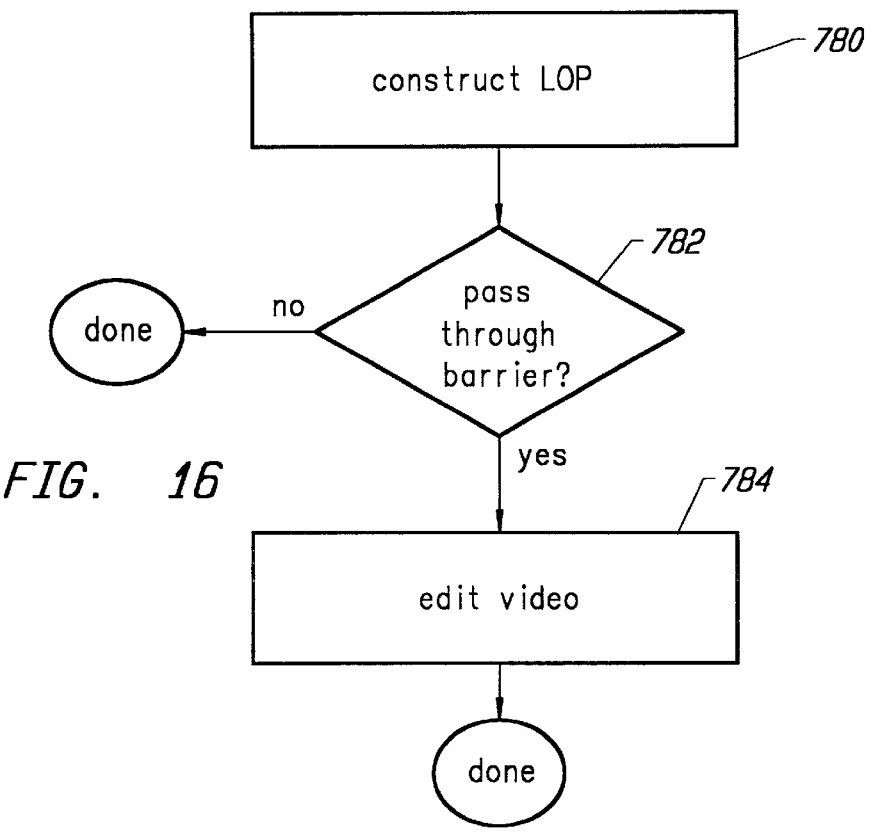
FIG. 16 is a flow chart describing how an object can be displayed when it is not visible to a particular camera.

FIG. 12A is a flow chart explaining the determination of the puck's three dimensional location (step 648 in FIG. 16). There are many suitable ways for determining the three dimensional location of the puck using the available data described above. One alternative involves determining lines of position. Once lines of position are known, there are many suitable methods to determine three dimensional location. FIGS. 12A and 12B explain two exemplar methods.

In step 680 of FIG. 12A, video processor 604 determines a line of position (LOP) for each cluster of each sensor. Thus, if there are twenty clusters transmitted to video processor 604, twenty LOPs are determined. The LOP is first calculated in "camera space," the coordinate system in which the infrared sensor is at the origin looking along the negative Y axis, with the X axis extending to the right and the Z axis extending upward. The LOP is then transformed into a three dimensional vector in the coordinate system of the arena.

In order to calculate the LOP in camera space, the sensor focal length and aspect ratio are measured in advance on an optical bench. This measurement indicates that a target a meter away if moved one pixel to the side moves h meters in space, and if moved one scan line up or down, moves v meters in space. From these ratios, given that the cluster is x pixels and y scan lines from the center of the sensor field of view, a vector is constructed:

$$V = (x*h,\ y*v,\ 1.0)$$

A line of position is represented as a point and a vector:

$$LOP = P, V$$

A point in three dimensional space is represented by a 4 element row vector: (x, y, z, 1.0). The 1.0 (sometimes called w) allows for translation. In camera space, point P is (0,0,0,1.0) since the sensor is at the origin. The LOP is a parametric representation of a line, since any point on the line can be represented as:

$$p = P + k*V, \ k \text{ is a scalar.}$$

An LOP is transformed into the three dimensional coordinate system of the arena by a 4×4 matrix. The three element vector is multiplied by the inverse of the upper left 3×3 matrix of the 4×4 matrix. The four element point is multiplied by the inverse of the 4×4 matrix.

For an infrared sensor rigidly mounted separate from a broadcast camera, the vector component of the LOP is transformed by the matrix (J):

$$J = TYPR,$$

where, $$T = \begin{bmatrix} 1 & 0 & 0 & 0 \\ 0 & 1 & 0 & 0 \\ 0 & 0 & 1 & 0 \\ -x & -y & -z & 1 \end{bmatrix}$$

$$Y = \begin{bmatrix} \cos yaw & -\sin yaw & 0 & 0 \\ \sin yaw & \cos yaw & 0 & 0 \\ 0 & 0 & 1 & 0 \\ 0 & 0 & 0 & 1 \end{bmatrix}$$

$$P = \begin{bmatrix} 1 & 0 & 0 & 0 \\ 0 & \cos pitch & -\sin pitch & 0 \\ 0 & \sin pitch & \cos pitch & 0 \\ 0 & 0 & 0 & 1 \end{bmatrix}$$

$$R = \begin{bmatrix} \cos roll & 0 & \sin roll & 0 \\ 0 & 1 & 0 & 0 \\ -\sin roll & 0 & \cos roll & 0 \\ 0 & 0 & 0 & 1 \end{bmatrix}$$

Since the infra sensor is in a fixed position, the yaw, pitch and roll can be measured during the registration process.

For infrared sensors mounted on a broadcast camera the transformation matrix (M) is:

$$M = XABCDO$$

$$X = TYPR$$

The matrices (ABCD) model the movement of the broadcast camera (e.g. pan, tilt, etc.). The matrix (O) has the same form as the matrix (X) and models the positional and rotational offset of the infrared sensor from the top surface of the camera head.

$$A = \begin{bmatrix} \cos pan & -\sin pan & 0 & 0 \\ \sin pan & \cos pan & 0 & 0 \\ 0 & 0 & 1 & 0 \\ 0 & 0 & 0 & 1 \end{bmatrix}$$

$$B = \begin{bmatrix} 1 & 0 & 0 & 0 \\ 0 & 1 & 0 & 0 \\ 0 & 0 & 1 & 0 \\ 0 & -foward & 0 & 1 \end{bmatrix}$$

$$C = \begin{bmatrix} 1 & 0 & 0 & 0 \\ 0 & 1 & 0 & 0 \\ 0 & 0 & 1 & 0 \\ 0 & 0 & -tiltrise & 1 \end{bmatrix}$$

$$D = \begin{bmatrix} 1 & 0 & 0 & 0 \\ 0 & \cos tilt & -\sin tilt & 0 \\ 0 & \sin tilt & \cos tilt & 0 \\ 0 & 0 & 0 & 1 \end{bmatrix}$$

$$F = \begin{bmatrix} 1 & 0 & 0 & 0 \\ 0 & 1 & 0 & 0 \\ 0 & 0 & 1 & 0 \\ 0 & -povdist & 0 & 1 \end{bmatrix}$$

$$E = \begin{bmatrix} 1 & 0 & 0 & 0 \\ 0 & 1 & 0 & 0 \\ 0 & 0 & 1 & 0 \\ 0 & 0 & -axisheight & 1 \end{bmatrix}$$

Pan and tilt angles are measured with the pan and tilt sensors 288 and 290. The forward offset distance (forward) is the distance that the tilt axis is positioned forward of the pan axis. The forward offset distance and optical axis height (axis height) can be measured directly from the camera head with a ruler. The tilt rise, which is the distance from the nominal position that the camera plate rises, can also be measured with a ruler and a lookup table built as a function of tilt angle. The POV (povdist) (or First Principal Point, or Front Nodal Point) is the position of the camera's virtual point of view measured as a distance forward of the tilt axis when the camera is in the horizontal position. The POV can be measured on an optical bench and a lookup table built as a function of zoom position, focus, and 2× setting. The POV is measured by placing two targets in the field of view of the lens, off-center, one farther away than the other, so they appear in line through the viewfinder. Where a line extended through those targets intersects the optical axis of the camera is the position of the virtual POV. The effective horizontal and vertical focal length of the lens ($f_h$ and $f_v$) are the half-width and -height of the camera's field of view at some distance divided into that distance. This is measured on the optical bench and a lookup table built as a function of zoom position, focus, and lens doubler. The aspect ratio is $f_h/f_v$ and is constant (not accounting for lense distortion), so usually $f_v$ is modeled for given settings and $f_h$ is equal to aspect multiplied by $f_v$.

After a line of position is determined for every cluster, video processor 604 groups all possible pairs of LOPs (step 682). For each pair of LOPs, video processor 604 finds the closest point of contact of the two LOPs (step 684). If the LOPs do not intersect the closest point of contact will be two points, one on each LOP. The line connecting the two points is perpendicular to both LOPs. To simplify the calculations, one embodiment contemplates using the midpoint of the line perpendicular to both LOPs as the closest point of intersection. However, both points can be used in the steps described below.

At the end of step 684, video processor 604 now has a set of points of closest contact. In step 686, video processor 604 finds a center of all of the points of closest contact. The center is the average of the coordinates of the points of closest contact. In step 688, video processor figuratively draws a sphere around the center point. The radius of the sphere is predefined. The radius should be big enough to allow the system to function, but small enough so that improper data is thrown out. In one embodiment, the radius is set as one meter. Each time the system is set up, a user may need to use trial and error to determine the proper radius. In step 690, video processor 604 determines whether all the points fit within the sphere. If not, video processor 604, in step 692, removes the furthest point and loops back to step 686. If all the points do fit within the sphere, then the average or center of the sphere is a candidate for the three-dimensional location of puck 10. One alternative is to reduce the radius for each iteration, continue iterating until the minimum radius is reached (e.g. 0.1 meter) and if there are a predefined number of points remaining (e.g. $\geq 2$) then a valid three dimensional location candidate has been found. Another alternative includes reducing the radius for each iteration, removing all points outside the sphere for each iteration, continue iterating until the minimum radius is reached (e.g. 0.1 meter) and if there are a predefined number of points remaining (e.g. $\geq 2$) then valid three dimensional location candidate has been found. The points of closest contact may form more than one separate groups of points, in which case the method of FIG. 12A can be repeated for each group of points and more than one location candidate will be determined. The incorrect candidates should be removed when removing false detections in step 650 of FIG. 11.

Another method for determining a three dimensional location based on lines of position is based on the probabilities of finding the puck at certain locations along or near the lines of position. FIG. 12B describes one exemplar method for using lines of position and probabilities to determine three-dimensional location. In step 696, lines of position are determined for each cluster of each sensor. In step 698, the system determines cones for each line of position. That is, each line of position can be thought of as a set of cones, one inside the other. Each cone represents a space with an assigned probability for the puck within that space. The set of cones is projected onto the playing surface. In step 700, a set of cubes are figuratively created. A first layer of cubes lie on the playing surface. A second layer of cubes are located above the first layer, and so on. Each cone is projected such that it passes through one or more cubes. For each line of position, each cube is assigned a probability equal to the probability of the cone passing through the cube. If more than one cone for a particular line of position passes through a cube, the cube is assigned the probability of the highest probability cone passing through it. If a cube lies within cones from more than one line of position, a cube will be assigned more than one probability. Each of the probabilities assigned to each cube are added and the sum is stored for each cube (step 702). If a cube was assigned only one probability, then that one probability is the stored sum. The cube with the highest probability sum is assumed to be the cube where the puck is (step 704). In one embodiment, the cubes are small enough so that the resolution of the cube is sufficient to find the puck in one iteration. In one alternative, the playing surface is divided into a small set of large cubes and step 704 determines which of the large cubes the puck lies in. Since the resolution of the cubes is not fine enough for the puck determination to be accurate, the process is repeated (in step 706) by looking back to step 700, dividing the one cube which contains the puck into smaller cubes, the probability is added up for the smaller cubes and the system determines which of the smaller cubes contains the puck. If the resolution of the small cube is sufficient, the method ends; otherwise, the method performs another iteration. The inventors contemplate numerous other equivalent implementations that make use of the probability of the puck's location that are within the spirit of the present invention.

FIG. 13 is a flow diagram describing one exemplar embodiment of how video processor 604 determines the position of the puck in the video frame of the selected broadcast camera and creates data which is sent to video modification unit 616. In step 710, video processor 604 transforms the three dimensional location of the puck to a two dimensional position in the video frame of the selected broadcast camera. A broadcast camera is represented mathematically by a 4×4 matrix which includes details of position and orientation. The three dimensional point is transformed into a two dimensional normalized frame location by multiplying the point by the camera matrix (K). The camera matrix (K) in its simplest form is a combination of rotation, translation, and perspective elements, all of which are represented by 4×4 matrices. In reality, the motion of the camera point of view (POV) is much more complicated with offsets caused by the kinematics of the tripod and the motion of the optical POV along the camera's optical axis due to lens characteristics. All these effects can be modeled as more complex linkages (additional matrices) between the fixed camera base and the resulting POV of the camera as the camera is moved through its range of controls. These techniques are well-known in the art.

In the disclosed embodiment, the broadcast camera is modeled as a 4×4 matrix which includes two parts—a fixed transformation (X) which represents the position of the camera in the arena and its orientation, and a variable transformation (V) which varies with changes in pan angle, tilt angle and the zoom:

$$K=XV$$

The fixed transformation matrix (X) models x, y, z position as well as fixed yaw, pitch and roll representing the camera's mount orientation:

$$X=TYPR$$

The variable transformation matrix (V) models not just the pan and tilt rotations, but also the complicated way the POV of the camera moves as it pans, tilts, and zooms. For a camera used with a Vinton Vector 70 camera head and a Canon J55 Super lens, the variable transformation is modeled in seven parts (matrices):

$$V = ABCDEFG$$

$$G = \begin{bmatrix} f_h & 0 & 0 & 0 \\ 0 & f_v & 0 & 0 \\ 0 & 0 & -(f+n)/(f-n) & -1 \\ 0 & 0 & -2fn/(f-n) & 0 \end{bmatrix}$$

The variables n and f are the distances to the mathematical near and far clipping planes; which are only important in assigning a useful range for z-buffered graphics drawing; therefore, nominal values are used of n=1 meter and f=100 meters.

The form of all seven matrices are defined above. Matrix (A) models the camera's pan on its fixed base. Matrix (B) models the tilt axis as a fixed distance forward of the pan axis. Matrix (C) models the tilt axis as a variable distance above the plane of the top of the tripod—the camera is raised as it tilts away from horizontal to counteract the tendency for it to tilt further forward or backward. The rise is a function of tilt. Matrix (D) models the camera's tilt angle. Matrix (E) models the optical axis of the lens as some fixed distance above the tilt axis. Matrix (F) models the lens moving forward and backward along the optical axis of the lens as a function of zoom. Matrix (G) models the effective focal length of the lens as a function of zoom, focus, and lens doubler (2x) settings.

In step 712, the graphic is scaled for the field of view of the broadcast camera. The field of view of the broadcast camera, based on location, pan, tilt and zoom, determines how big the puck should be in the video frame. In step 714 video processor draws a black window (or video frame) and then places a graphic (or image) at or near the location of the puck. In step 716, the window is sent to video modification unit 616.

During operation, video processor 604 may not receive data for a particular video frame of the broadcast camera. In such a situation, if only one or a small number of frames of data are lost, it is possible that video processor 604 can interpolate the location or position of the puck so that the enhancement of the television presentation of puck 10 will be continuous. After pan/tilt/zoom data is received, video processor 604 attempts to receive cluster data, similar to step 642 in FIG. 11. Since no useful cluster data is transmitted, video processor 604 waits for the next data. After the location of the puck is determined for the next video frame, video processor 604 considers the location of the puck before and after the lost video frame in order to interpolate where the puck should have been during the lost video frame. As discussed above, before a frame of data is sent to video modification unit 616 it is delayed five frames. In order to interpolate for one frame of lost data, video processor 604 needs to wait for an extra frame of data. This extra delay is added to the five frame delay discussed above. Thus, the total delay is six frames. In one embodiment, the video is always delayed ten frames, allowing five frames for interpolation.

E. Showing The Graphic Below the Object

Figure 14:
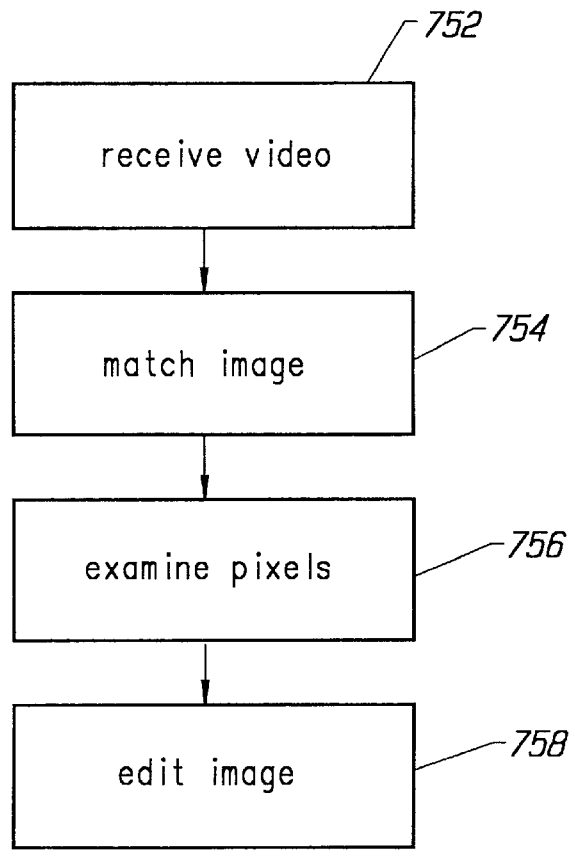
FIG. 14 is a flow chart describing how an object can be highlighted without obscuring the image of the object.

Referring back to FIG. 11, step 654 includes enhancing the presentation of a selected broadcast camera. In one embodiment, the enhancement includes adding a video image (or graphic) to the existing video frame. For example, the added video image could include a transparent cloud superimposed on the image of the puck. Alternatively, other images can be added to the video frame in order to enhance the presentation of the puck or other object. In one embodiment, the transparent cloud is superimposed in front of the puck. In a second embodiment, the transparent cloud can be superimposed behind the puck so that the image of the puck is not significantly obscured. FIG. 14 is a flow chart which describes how an object (in this case the puck) can be highlighted without significantly obscuring the image of the object. The flow chart of FIG. 14 can be performed as part of step 654 of FIG. 11.

In step 752 of FIG. 14, video processor 604 receives a video signal from video control 618. Alternatively, video processor 604 can receive the video signal directly from a camera, memory, tape, or other source. In addition, the video signal can be received by another computer in order to perform at least some or all of the steps of FIG. 14. In the system of FIG. 10, video processor 604 would receive a video frame from video control 618. The received video signal will likely include an image of the target.

Steps 754–758 include adding the transparent cloud (a second video image) to the received video signal such that the transparent cloud appears to be behind the image of the puck. In step 754 video processor 604 matches the transparent cloud to the video frame. Prior to step 754 video processor 604 had already determined the position of the puck in the video frame. In step 754 video processor 604 symbolically places the transparent cloud in front of the video frame such that the puck is behind the transparent cloud. In other words, video processor 604 is basically determining what pixels would be changed by combining the transparent cloud with the video frame such that the transparent cloud highlights the puck. Thus, video processor 604 is matching each pixel of the transparent cloud to a pixel of the video frame. In one alternative, the transparent cloud or other video image to be inserted can be placed logically near the puck, but not necessarily completely covering the puck. Thus, the transparent cloud is placed at a position that corresponds to the position of the puck.

In step 756, video processor 604 examines each of the pixels in the video frame that were matched in step 754, paying attention to a predetermined test attribute. There are various test attributes that can be used. Two basic attributes that are suitable include chromaticity information and luminance information. Alternatively, the system can look at hue, saturation, brightness, lightness, red-primary information, blue-primary information, green-primary information, etc. (or some combination thereof). The attribute is selected in order to "identify" the target. However, the target is not actually identified. Rather, pixels with a certain attribute having certain values are identified. Alternative embodiments can include actually identifying the target's image.

In the system for highlighting a hockey puck, step 756 can include looking at the brightness of each pixel. Since the puck is dark, the goal is to find those pixels that are dark. This scheme may also identify black skates, which will not be a problem since the result will be that the transparent cloud will not occlude the skate. In one embodiment, step 754 can be eliminated and step 756 is performed on all pixels.

In step 758, the original image of the hockey game is edited. As discussed above, enhancing the video in step 654 can include adding a highlight to the video frame. Step 758 alters how that highlight is added to the video frame from the broadcast camera. In one embodiment, step 756 includes determining whether the attribute under scrutiny is within a threshold. If the pixel is within the threshold, then that pixel is not edited in step 758. If the pixel is not within the threshold, then the pixel is a candidate for being edited in step 758. For example, if the threshold was to find all pixels that are below a certain brightness level, then the transparent cloud may be added to the image of the hockey game except for the pixels that are below the brightness level threshold. The step of editing can include using video processor 604 to edit the frame the video captured by the broadcast camera to add the transparent cloud. Another embodiment includes using a keyer to edit the image from the broadcast camera. Two of the inputs to the keyer include the video frame from the broadcast camera and a video frame including the transparent cloud. As discussed above, video processor 604 would send a key to the keyer defining how to combine the two video frames. In the embodiment where step 756 includes determining whether the attribute is within a threshold, video processor 604 would adjust the key such that any pixel in the video frame captured by the broadcast camera that is within the threshold would not be combined with a pixel from the transparent cloud. If the video frame from the camera is the foreground and the video frame from the processor that includes the transparent cloud is the background, the key for the pixel within the threshold would indicate all foreground. Other pixels that match with the transparent cloud but do not meet the threshold would have a key that instructs the keyer to mix the foreground and background.

A more graceful way of performing steps 756 and 758 in congruence with the steps of FIG. 11 include using steps 756 to modify the key already prepared by video processor 604. That is (looking at FIG. 11), in step 654 video processor 604 creates a video frame that includes the transparent cloud and sends that video frame, along with the video frame from the broadcast camera, to the keyer. Prior to the steps of FIG. 14, video processor 604 created a key that properly combined the two video frames so that the transparent cloud was centered over the puck. Steps 756 and 758 can be used to modify that key so that the image of the transparent cloud will appear to be behind the image of the puck. In step 756, each pixel will be examined by looking at its brightness level. In step 758, the key for each pixel can be modified based on the brightness level examined in step 756. If the pixel is very dark, the key for the pixel is modified to add more foreground, or in some cases all foreground (the video frame captured by the broadcast camera). If the brightness level of the pixel indicates that the pixel is light, the key for the pixel can remain unchanged.

In one embodiment, the change in the key could be represented as a gradual curve. Where a very dark pixel can be all foreground and a very light pixel can include a lot of background and pixels having intermediate brightness levels will have intermediate changes to the key. Another alternative includes looking for edges. That is, a group of pixels may have a similar brightness level because these pixels represent the puck. Where the image of the puck ends the brightness level may change dramatically. When the system notices a dramatic change, the system can gradually reduce the amount of foreground (relative to background) to create a sort of "fuzzy edge" or transition zone.

In one embodiment, step 756 is carried out for all pixels and then step 758 is carried out, after step 756, for all pixels. In another embodiment, steps 756 and 758 are performed consecutively in a loop, one iteration for each pixel. The software for performing the steps of FIG. 14 resides in a memory, a hard disk or other peripheral device attached to video processor 604. The steps of FIG. 14 can be performed in real time in order to allow the hockey game to be broadcast live. Thus, the steps of FIG. 14 can be performed on thirty frames per second or sixty fields per second.

Figure 15:
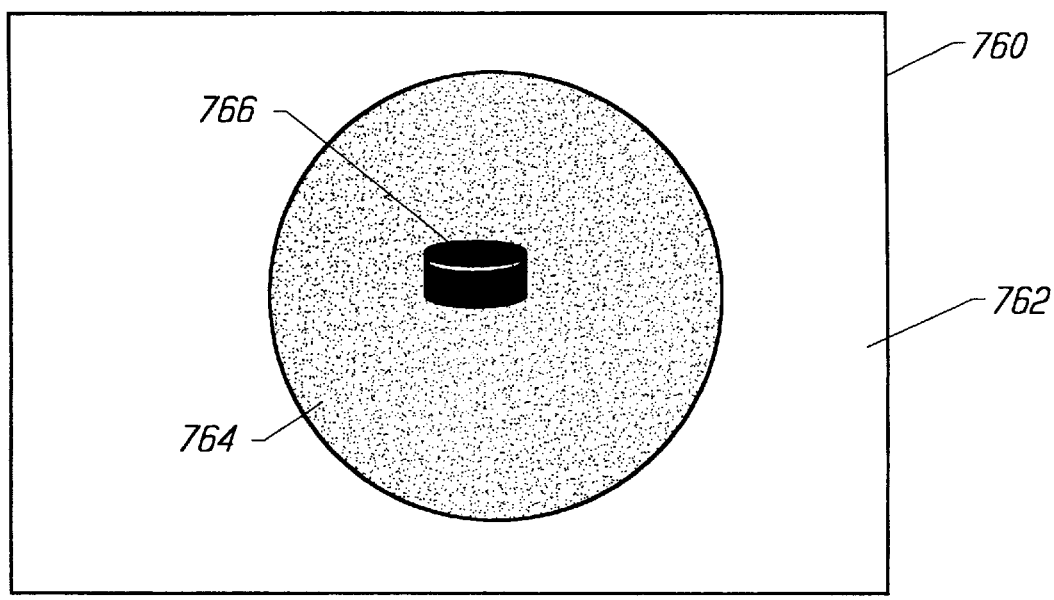
FIG. 15 shows a video frame which includes an image of an object and a highlight.

FIG. 15 shows a video frame 760 after step 758. Within the video frame is a white ice surface 762. Located on ice surface 762 is puck 766. Added to the video frame is a gray circle 764 which can be a transparent cloud. Puck 766 appears to be in front of circle 764. Although the above discussion mentions a transparent cloud, various other images can be added to the video frame in a similar manner.

F. Showing A Hidden Object

Another enhancement to step 654 of FIG. 11 includes showing the puck or other object to the television viewer when the puck cannot be seen by the camera due to an obstruction. For example, the puck may be at the edge of the ice, next to the boards that surround the ice rink. If the camera is behind the boards, then the boards will obstruct the camera's view of the puck. Infrared sensors throughout the arena that have a clean line of sight to the puck can still be used to determine the three dimensional location of the puck. However, the particular broadcast camera whose view is obstructed by the boards will not be able to see the puck.

To enhance a video in order to compensate for the situation when the puck is within the field of view of a camera but is not visible to a camera, the system first determines whether the puck is visible to the camera. If it is visible to the camera, then the system takes no special steps to compensate for a hidden puck. If the puck is not visible to the camera, then the system can choose to edit or not edit the video in order to compensate for or otherwise indicate the hidden puck.

FIG. 16 is a flow chart that describes one embodiment for editing a video frame so that an object can be displayed when it is not visible to a particular broadcast camera. Prior to performing the steps of FIG. 16, the system has already determined the three dimensional location of the puck and the three dimensional location of the camera.

Steps 780 and 782 are used to determine whether the puck is visible to the selected broadcast camera. In step 780, a line of position (LOP) is symbolically constructed from the broadcast camera to the puck, as discussed above. In step 782, it is determined whether this LOP passes through any barriers. A barrier is defined as any object through which the camera cannot see through clearly. A known barrier is a barrier that is known to the system. That is, the location of the barrier is stored by the system. A fixed barrier is a barrier that does not normally move. For example, clear glass is not a barrier while the boards that surround a hockey rink is a known fixed barrier. In some embodiments, tinted glass or glass which causes distortion is a fixed barrier. A skate can be a mobile barrier rather than a fixed barrier. If the LOP does not pass through a barrier, then the puck is visible to the broadcast camera. If the LOP does pass through a barrier, then it is determined that the puck cannot be viewed by the camera. In one embodiment, step 782 only tests for known barriers. Prior to operation of the system, an operator will measure the location and size of the known barriers and this information will be stored by the system. In another embodiment, step 782 will only test for fixed barriers. In another embodiment, step 782 will test for barriers regardless of whether they are fixed or mobile. One method for implementing step 782 includes symbolically defining a surface to be the same shape as the ice surface. This surface is then symbolically projected to be at the height of the top of the boards surrounding the ice. If the LOP passes through this surface, then the LOP does not pass through any known barriers.

Steps 780 and 782 are one method of determining whether a puck or other target is visible to a camera. Another embodiment for determining whether a puck or other target is visible to a camera includes co-locating a sensor with the camera so that the sensor and the camera have, roughly, the same field of view, for example, mounting the sensor on the camera If the sensor cannot see the puck, but data from other sensors leads to the conclusion that the puck is within the co-located sensor's field of view, then the puck is not visible to the camera. This embodiment, therefore, can detect when a puck is behind a barrier that is not known and/or is not fixed.

Prior to steps 780–784, the system in step 652 determined the position of the puck in the video frame of the selected camera. In the example where the puck is behind the boards and is not visible to the camera, the system will still determine a position in step 652 corresponding to the position of the puck in the camera's field of view. If the puck is visible to the camera, then the position of the puck in the camera's field of view corresponds to a position of the puck in a video frame captured by the camera. When determining the position of the puck in the video frame or in the field of view, the system is determining whether the puck is in the field of view of the camera. That is, if the transformation of the puck's three dimensional location results in a pixel coordinate off the video frame, then the puck is not in the camera's field of view.

In step 784 the system edits the video by drawing an image of the puck and adds that image to the video frame at the position determined in step 652. Thus, although the broadcast camera cannot view the puck because of an obstruction, a viewer watching the game on television would actually see an image of the puck at the boards, sort of giving the user "x-ray" vision through the boards. Instead of adding an image of the puck, the system could add any other suitable image or images (including the transparent cloud highlight without the puck). Alternatively, after determining that the puck is not visible to the selected broadcast camera, the system can choose to not edit the video frame. Editing the video frame can be performed using any of the technologies discussed above. Additionally, when the system edits the video, other images can be inserted rather than an image of the puck and these images can be inserted at a position logically corresponding to the puck's position (e.g. puck's position, x units displaced from puck, immediate left, behind path of puck, etc.). The software for performing the steps of FIG. 16 resides in memory, a hard disk or other peripheral device attached to video processor 604. The steps of FIG. 16 are performed in real time.

Figure 17:
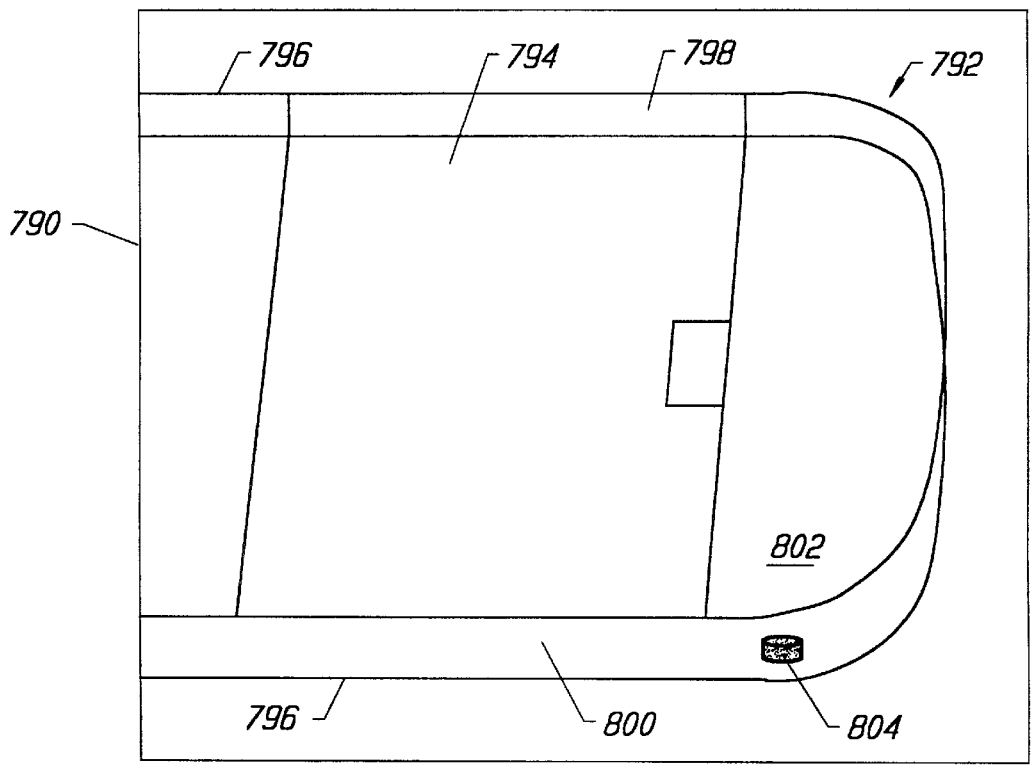
FIG. 17 shows a video frame depicting a portion of a hockey rink and a puck.

FIG. 17 depicts a video frame 790 after step 784. Video frame 790 shows a portion of hockey rink 792 which includes ice surface 794 and boards 796 surrounding the ice surface. For simplicity, glass connected to the top of the boards is not shown. Because of the placement of the camera to the side of hockey rink 792, the camera can see an inside portion 798 of the boards and an outside portion 800 of the boards. Assume for this example that the puck is lying against the boards on ice surface 794 in corner 802. Because of the placement of the camera, the camera cannot see the puck because the camera's view is blocked by boards 796. Using steps 780–784, the video frame is edited to add an image of the puck 804 to the video frame so that the television viewer can see where the puck is.

G. Registration

Registration is the process of defining how to interpret data from a sensor (a camera being one type of sensor). The sensors described above output data, for example, related to position. Since position is relative, the system needs a reference from which to determine position or location. Thus, in order to be able to use positional data, the system needs to know how to interpret the positional data to make use of the information. One example of how to interpret data from different sensors is to use the matrices described above. In that embodiment, defining how to interpret data includes determining the matrices.

Figure 18:
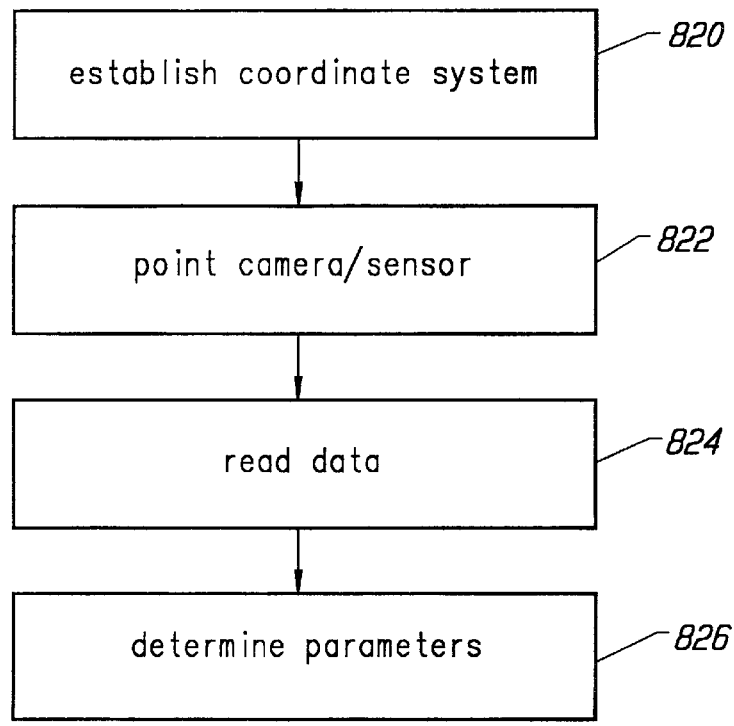
FIG. 18 is a flow chart of the registration process.

FIG. 18 is a flow chart for registering a sensor in the embodiment disclosed above. Other sensors may be registered similarly. The first step 820 is to establish a coordinate system, which is accomplished by using x, y, z axes with the origin or center point (0,0,0) being at the center of the hockey rink, on the ice. Three or more registration points (e.g. eight) are marked on the rink in addition to the center location. The distance from the center point, the walls and neighboring points can be measured for each registration point so that the coordinates of the registration points can be computed. The sensors can be registered by solving for the unknown variables in the above described matrices. In other systems, the center point can be anywhere appropriate.

Registering the broadcast camera involves the determination of the matrix (X). In step 822, a broadcast camera is pointed at each registration mark in turn, centering the registration mark in the field of view using the center reference mark in the viewfinder. In step 824, the pan and tilt angles are read and the variable part of the camera transform is calculated for each mark using an arbitrary constant zoom value. (In one embodiment, zoom is not a factor in these comparisons, as each registration mark is centered in the field of view on the camera's optical axis. Some constant value is used so errors of different registration marks can be directly compared.) In step 826, the matrix parameters are determined. An initial educated guess at the parameters (e.g. x, y, z, yaw, pitch, roll) is made and the fixed component matrix is calculated. For each registration point, the fixed matrix (X) is concatenated (multiplied) with the variable matrix (V) for each registration point to obtain the composite camera matrix. Then, the three dimensional location of the registration point is transformed by the composite camera matrix to a two dimensional position in the broadcast camera's video frame. An error is determined representing the distance from the calculated two dimensional position to the center of the video frame. The fixed transformation parameters are varied until the error is minimized, at which point the camera is said to be registered and the resulting fixed matrix (X) is used for subsequent calculations.

To register a stationary infrared sensor that is not mounted on a broadcast camera, infrared emitters are placed at the registration points. Since these sensors are rigidly mounted, they cannot be panned and tilted. At least some of the infrared emitters must, therefore, be placed within the field of view of the sensor. In step 824, the sensor detects the emitters, and clusters are created. In step 826, an initial educated guess is made at the parameter values for the transformation matrix (J) and the 2D projections of the three dimensional locations of the registration marks are determined using matrix (J). An error number is determined between the calculated locations (via the matrix) and observed locations of the registration marks on the sensor's CCD. The parameters are varied and the process is repeated until the error is minimized, at which time the sensor is said to be registered and the resulting matrix is used for subsequent calculations.

Registering a camera-mounted infrared sensor is the process of determining the matrix (O). First the broadcast camera on which the infrared sensor is mounted is registered (the X matrix is determined). In step 822, infrared emitters are placed at the registration marks and the broadcast camera is oriented to give the sensor a view of the infrared emitters. In step 824, the sensor detects the emitters. The pan and tilt angles are read and the ABCD matrices are calculated. Matrix (G) is calculated using the measured focal length of the sensor. Matrix (O) is the only undetermined part of the equation. A first educated guess is made at the matrix (0) parameters and the composite transformation matrix is calculated. The three dimensional locations of the registration marks are calculated using the transformation matrix and an error is determined between calculated location and the measured location of the registration marks. The parameters are varied until the error is minimized, at which time the sensor is said to be registered and the determined matrix (O) is used for subsequent calculations. Alternatively, the x, y, z offsets of the infrared sensor relative to the camera plate can be measured directly rather than solving for them.

As an alternative, the location and orientation of the broadcast cameras and sensors can be measured relative to the center location. A tape measure can be used to determine the position of the cameras and sensors, or the cameras and sensors can be surveyed.

In one alternative, the system can also register h and v used in the matrices described above. If they are registered, the registration process should start with the values of h and v measured on an optical bench and vary them to see how they affect the error.

One embodiment includes registering the system for the zoom of the broadcast camera. As discussed above, the system includes a zoom sensor which measures an electrical output from the zoom lens. The zoom data is used to access a look up table which pairs particular zoom voltage levels to a zoom value. The measured zoom can have errors due to bias, gain or focal length. One method for registering to compensate for these three errors includes using the system to superimpose the graphic onto a video frame and manually see whether that graphic is properly centered over the puck. Any misalignment can be used to adjust the zoom data.

One embodiment the system includes registering the system to compensate for twist in the CCD of a camera or sensor. In most cases, it is not necessary to register for twists. One method for registering for twists includes sliding a puck back and forth along the ice (or panning the camera) so that the puck moves across the field of view for the CCD horizontally. That is, there should be no vertical motion. If the puck does move vertically, then the system should vary a twist value until the vertical motion is reduced to acceptable levels. The matrix for camera discussed above does not include any twist values. If twist compensation is to be included in the system, the following additional matrix would be added to the composite matrix (v) (e.g. multiplied by the other matrices):

$$\begin{bmatrix} \cos twist & 0 & \sin twist & 0 \\ 0 & 1 & 0 & 0 \\ -\sin twist & 0 & \cos twist & 0 \\ 0 & 0 & 0 & 1 \end{bmatrix}$$

The twist parameter can be varied so that the motion of the puck in the horizontal direction will not cause any vertical motion.

Figure 19:
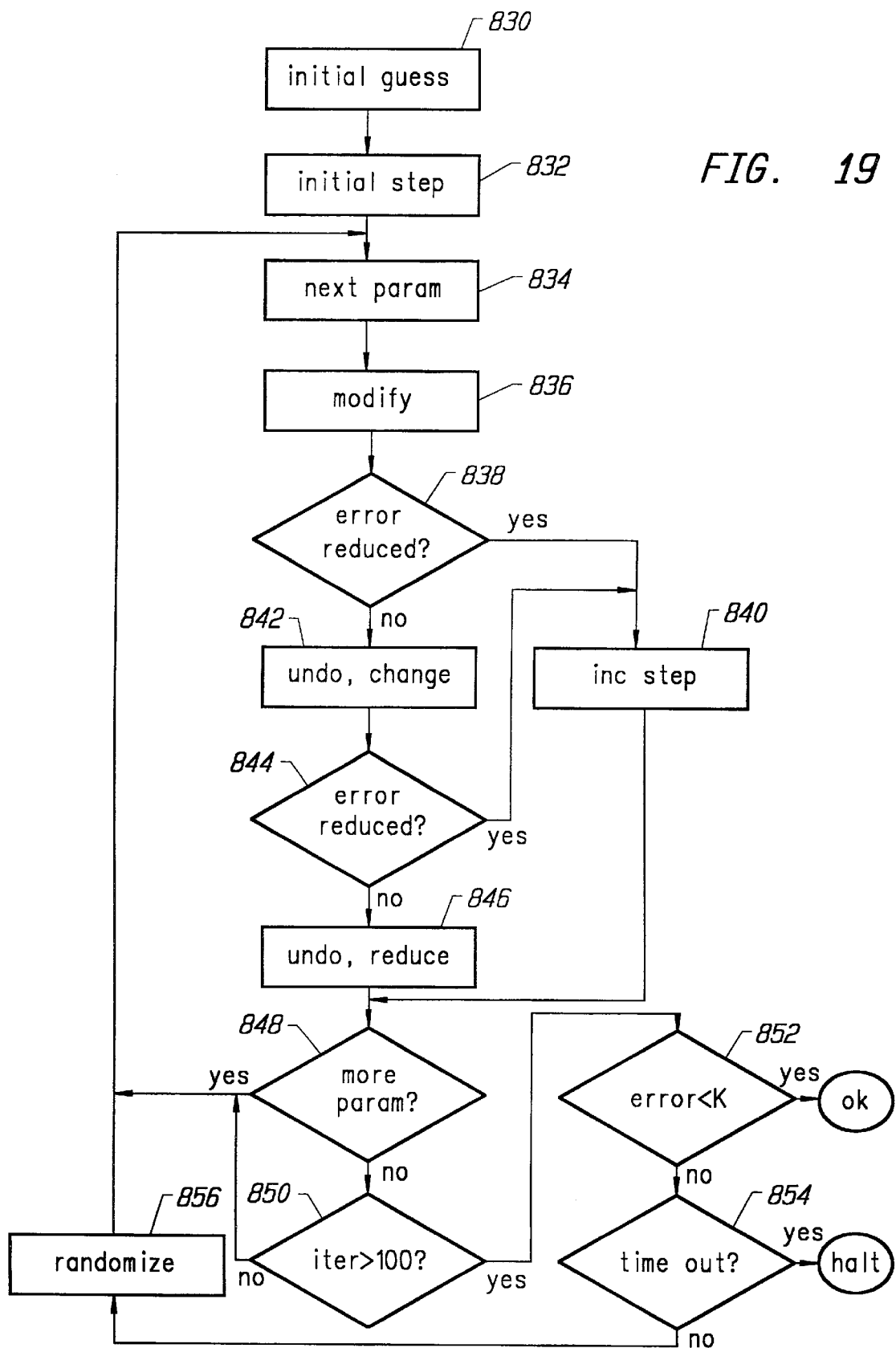
FIG. 19 is a flow chart of the process for varying the parameters.

FIG. 19 is a flow chart which describes step 826 of FIG. 18 in more detail. As discussed above, registering a rigidly mounted sensor (e.g. not mounted on a camera) involves determining the parameters for the matrix (J), which include x, y, z, roll, yaw and pitch. In step 830 an initial educated guess of the parameters is made. On example of an initial educated guess is to pick the x, y and z coordinates of a location at the closest of one of the four corners of the rink, at the height of the roof of the arena and with the sensor squarely pointing at the center of the hockey rink. Step 830 also includes evaluating the error of the initial guess.

For the infrared sensor, error is evaluated by projecting the three dimensional registration mark location onto a calculated two dimensional sensor CCD location. The three dimensional location of the registration mark is represented as the four element row vector (x, y, z, w) (where w=1). The row vector is multiplied by matrix (J) to yield a three dimensional location in sensor space labeled as (x', y', z', w'). The three dimensional location in sensor space is converted to an offset (sx, sy) from the center of the sensor field of view in pixels horizontally and scan lines vertically, as follows:

$$sx=(x'/z')/h$$

$$sy=(y'/z')/v$$

The error is the difference between the calculated position on the CCD and the center of the cluster (cx, cy), which is calculated as follows:

$$error=(sx-cx)^2+(sy-cy)^2$$

Total error for a set of registration points is the sum of the individual errors for each registration point.

In step 832, the initial step size and the sign of the step are assigned for each parameter to be varied. An example of an initial step can be one meter for x, y, z and one degree for roll, yaw and pitch, all being a positive sign. The initial step size and sign should usually be chosen based on trial and error. In step 834, the next parameter is chosen. The first time step 834 is performed, the first parameter is chosen. The parameter is modified by the current step size for that parameter in step 836. For example, if the initial guess is 100, the initial step is 1 and the initial sign is positive, then step 836 modifies the parameter to be 101.

The system evaluates the new error and determines whether modifying the parameter reduced the error in step 838. If the error was reduced, then the step size is increased. One embodiment multiplies the step size by a random number n, where 1<n<2.

If in step 838 it is determined that the error was not reduced, then in step 842 the sign of the step is changed (e.g. from positive to negative), the most recent modification to the parameter is reversed and the parameter (after the most recent modification is reversed) is modified by the step size with the new sign. The error is evaluated for the newly modified parameter and, in step 844, it is determined whether the error has been reduced from the error calculated in step 838. If it has been reduced, the system then performs step 840; otherwise, the system changes the step size in step 846 by reducing the step size by fifty percent and the previous modification to the parameter is reversed.

After both steps 840 and 846, the system (in step 848) determines whether there are more parameters left to consider in this iteration. For each iteration, the system performs steps 836-846 once for each parameter. In the example where the system is solving for x, y, z, pitch, roll and yaw; steps 5 836-846 are performed six times for each iteration. If there are more parameters to consider for the current iteration, then the method loops back to step 834; otherwise, the method proceeds to step 850 which test the number of iterations. If there have been one hundred or less iterations, then the system loops back to step 834 and performs another iteration. An iteration is the process of performing steps 834–850. After the one hundredth iteration, the system determines whether the error is less than a constant (step 852). If so, then the registration has completed successfully. An example of a constant is 0.15 pixels per registration point. Thus, if there are nine registration points, the constant used in step 852 is:

$$\text{error constant} = 9(0.15)^2 = 0.2025$$

If the error is not below a constant, then the system checks to see if it timed out (step 854). An example of a time limit used in step 854 is ten seconds. If the system has not timed out then randomization process 856 is performed. After randomization step 856, the method loops back to step 834 and initializes the iteration counter back to zero.

If the system timed out, the registration process halts. The system reports the latest error value to a human operator. The human operator can decide that the error value is close enough to the constant tested for in step 752 and, thus, registration is done. Alternatively, the operator can decide to take a remedial action and start the registration process again. The remedial action may include re-measuring the registration points, re-entering data, simply trying again or other suitable actions.

The randomization process attempts to correct stuck solutions. The range of guesses starts very large in hope that a very wrong solution has a good chance of being improved by a few guesses spread through the space of all possible solutions. No change is made to a guess unless a lower error number is discovered. The range of random guesses is decreased in expectation that we have a better chance of finding a true good solution closer to the current best. The range is not reduced so rapidly as to get immediately stuck in the current solution "hole."

Figure 20:
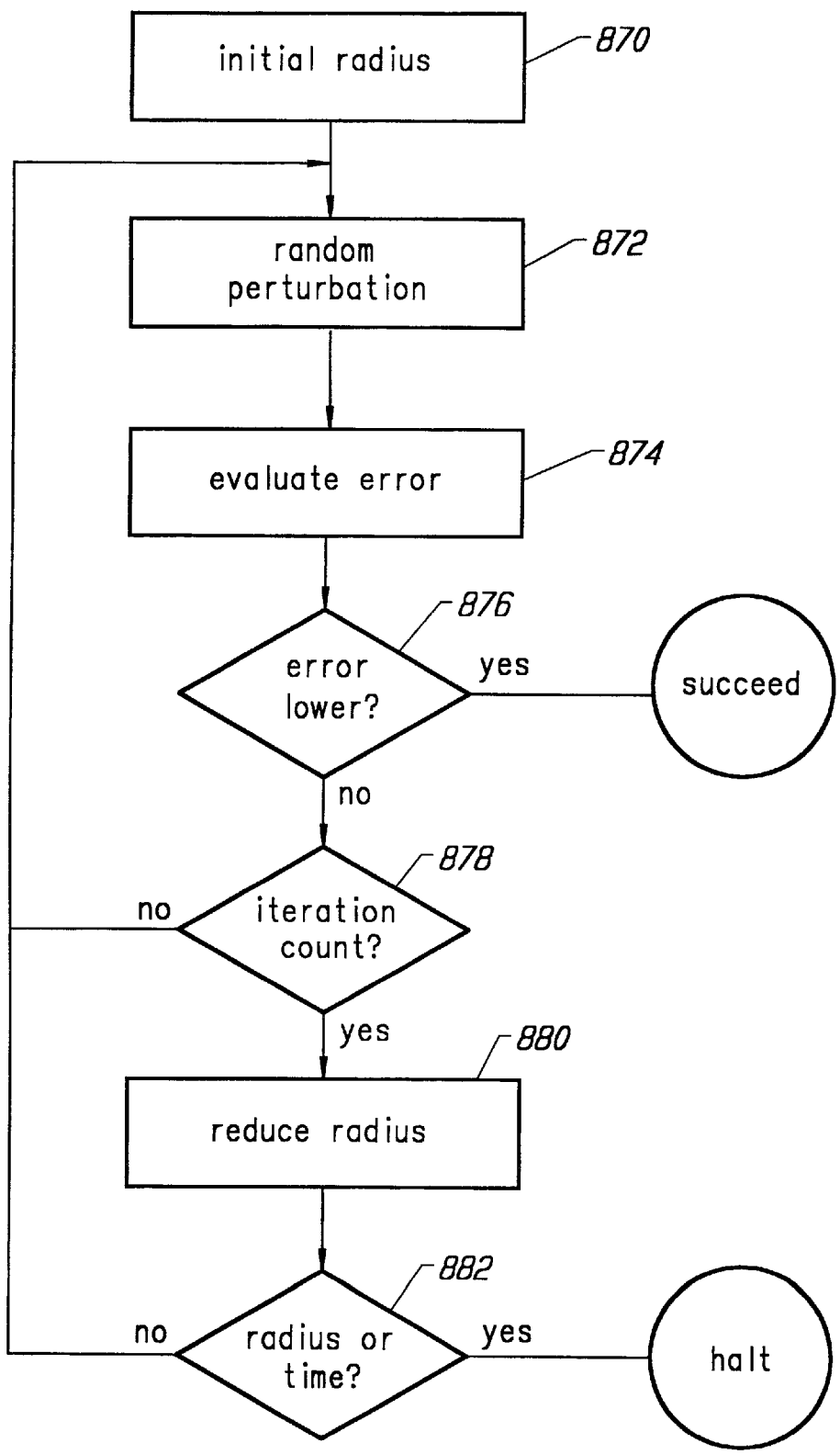
FIG. 20 is a flow chart of the randomization process.

FIG. 20 is a flow chart of the randomization process of step 856 in FIG. 19. Step 870 includes picking an initial randomization radius. The radius is defined to mean the amount by which a parameter can vary. One embodiment for performing step 870 contemplates the user supplying the radius of the area for which the system is being used in. For example, in a hockey arena the initial radius may be 100 meters for x, y, z and 180° for roll, yaw and pitch. Step 872 includes a random perturbation of all the parameters. That is, for each parameter a random number n is generated, where −1<n<1. The number n is multiplied by the radius for the particular parameter and the resulting product is added to the parameter. In step 874, the error is evaluated and in step 876 it is determined whether the error has been lowered due to the most recent perturbation of the parameters. If the error has been reduced, then the random process is complete and successful. Otherwise, in step 878, the system determines whether the maximum iteration count is exceeded.

Step 878 is designed to prevent the process of FIG. 20 from continuing forever. An example of a suitable iteration count is $10 \times 2^m$ where m is equal to the number of parameters. The iteration count should be no greater than one thousand. In the case where there are six parameters, the iteration count is equal to 10*26=640. The system maintains an iteration counter which starts at zero and each time step 878 is performed the iteration counter is incremented by one and compared to the iteration count. If the iteration counter is less than or equal to the iteration count, then the system loops back to step 872. If the iteration counter is greater than the iteration count, then the method proceeds to step 880 which includes reducing the radius by fifty percent.

After reducing the radius, the system determines whether the radius is less than the preset number or whether a time limit has been exceeded. An example of a preset limit on the radius is one centimeter or 0.001 degree. An exemplar time limit is 10 seconds. The value compared to the time limit is the time elapsed since the process of FIG. 19 began. If either of these limitations are met, the system halts the randomization process. Otherwise, the system loops back to step 872 and performs a random perturbation again. If the system succeeds in finding a lower error, then the process of FIG. 19 is resumed. If the system halts the randomization process, then the system stops and reports the error to an operator.

After the method of FIG. 19 is completed, an average error value is reported to the operator. This reported error is calculated as follows:

$$error = \frac{\sqrt{\left(\sum_{i=1}^{n}(cx_i - sx_i)^2 + (cy_i - sy_i)^2\right)}}{n}$$

A reported error value less than 0.5 (half pixel average error) is considered good. A value less than 0.1 is exceptionally good. A value greater than 1.5 indicates a probable error in measurement. A value greater than 5 indicates a serious error.

One embodiment includes performing dual registrations. Due to optical and mechanical properties of the lens, the optical axis of a camera may differ between 1× and 2× modes of a 2× expander. To account for the two modes, the system can perform two registrations, one for 1× mode and one or 2× mode. During operation, the system will sense whether the lens is in 1× mode or 2× mode and use the appropriate matrix parameters. Additionally, zoom and twist registrations can be performed.

H. Re-Registration

During a live event, such as a hockey game, it is possible that a sensor that has previously been registered becomes mis-registered. By the term "mis-registered" is meant that something happens such that data from that sensor cannot be properly interpreted. For example, the sensor could be bumped such that its orientation is changed and, therefore, matrix (J) can no longer be used to accurately transform data from the sensor. If the sensor is bumped prior to the live event, then the system can be re-registered. If the sensor becomes mis-registered during a live event, the system cannot be brought down in order to re-register the one sensor. Furthermore, during the live event there may not be access to the playing field (or ice) for registration purposes.

Figure 21:
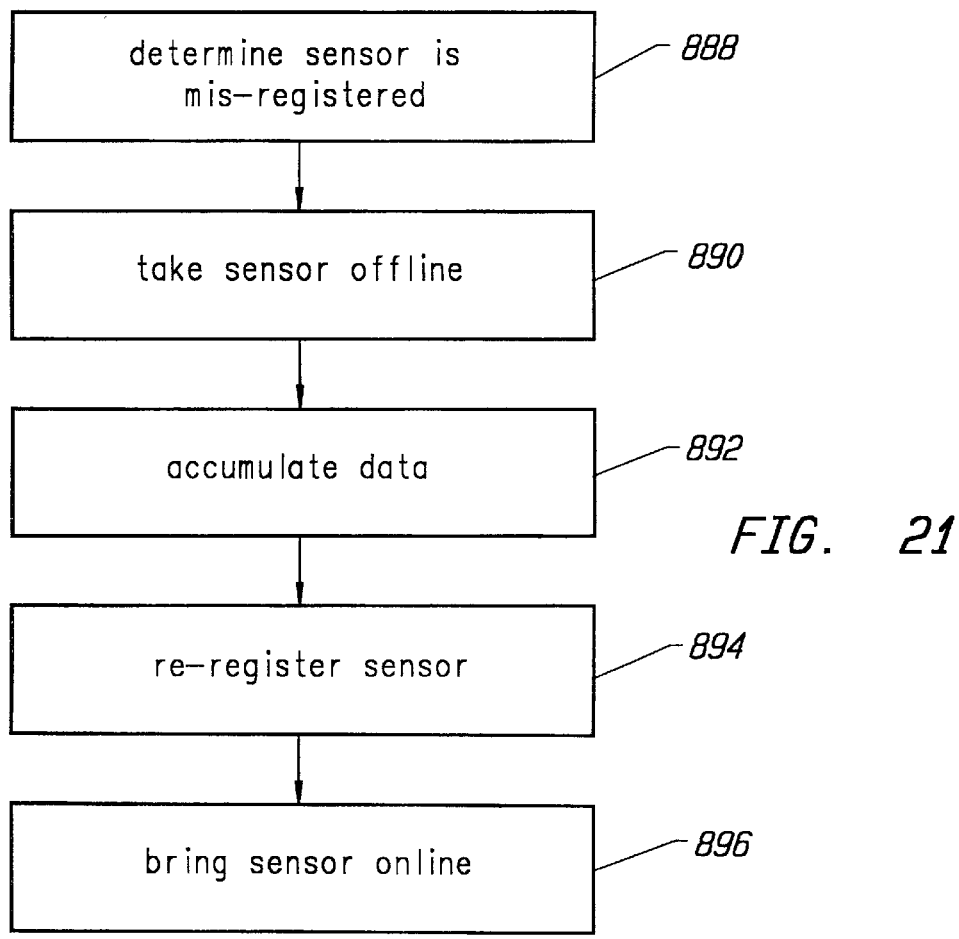
FIG. 21 is a flow chart of the process of re-registering a sensor.

FIG. 21 explains the process of re-registering a sensor during the live event. All of the steps of FIG. 21 can be performed during the live event. In step 888, it is determined that a sensor has become mis-registered. In the infrared tracking system described above, the system can determine that a particular sensor has become mis-registered by monitoring the lines of position. Over time, the system can monitor how far each LOP is from the calculated three dimensional location of the puck. The distance (called an error distance) is measured by symbolically drawing a line from the three dimensional location of the puck to the LOP such that the line intersects the LOP at a right angle. Over time the system will keep a record of these error distance and will look for one sensor that continually has a larger error distance than other sensors. This identified sensor will be considered mis-registered. If in a particular frame a particular sensor has a substantially large error distance (e.g. 3 meters), then it is assumed that the sensor is seeing another infrared light source. The system also monitors how often data from a particular sensor is used to calculate a location of the puck. If a sensor is not being used, then it may be mis-registered.

Alternatives to step 888 include looking for lines of positions that point to locations outside of the hockey rink, have a motion sensor or other type of sensor to determine that the sensor has been moved, look manually or have an operator look at graphical representations of the LOPs so that an operator can see that one or more LOP is unreasonably different from the other LOPs. In one embodiment, step 888 is eliminated and the system re-registers a sensor at a predetermined time interval or when instructed to do so by a human operator.

In step 890, the mis-registered sensor is taken off line. That is, the sensor is still being operated and used to collect data; however, its data is not being used for its intended purpose. Thus, data from the off line sensor is not used to find the three dimensional location of the object being tracked (e.g. the puck). In one alternative, the misregistered sensor is not taken off line.

In step 892 the system accumulates data. The data being accumulated is stored in pairs. One member of the pair is cluster data from the sensor that is mis-registered. The second member of the pair is the three dimensional locations being calculated from the data acquired from the sensors which are registered properly. Over time the system acquires a set of pairs of data. In one embodiment of step 892, data is saved every second. Data is not saved for every frame because too much data will accumulate. Step 892 can be stopped by any number of means. One method is to represent the field of view of the mis-registered sensor on a computer display and graphically place a mark for each cluster sensed by the sensor. An operator will manually terminate step 892 when there is a good distribution of data spread throughout the field of view. Alternatively, this process can be automated. For example, the field of view can be divided up into "symbolic buckets." Step 892 can be terminated when a threshold number of buckets include data. Alternatively, step 892 can be terminated after a specific amount of time (e.g. 30 seconds). Another alternative includes selecting points of data based on quality value; for example, angle between LOPs, distance to sensor, infrared signal intensity, etc. Yet another alternative includes stopping step 892 after a predetermined amount of time.

After step 892 is completed, the system re-registers the mis-registered sensor using the accumulated data (step 894). That is, the system will attempt to determine the parameters for matrix (J) for the particular sensor that is taken off line. This includes performing the steps of FIG. 19 with some modifications. In step 830, the initial guess consists of the parameters originally used to register the sensor. In steps 830, 838, 844 and 852, the error is evaluated by using the pairs of data accumulated from step 892 in FIG. 21. That is, rather than using an infrared emitter for registration, the three dimensional location of the puck at a particular time is transformed into a position on a CCD using the math discussed above and this position is compared to the exact cluster location measured on the mis-registered sensor. The cluster location and the three dimensional position are the corresponding pair that was accumulated in step 892. The error is calculated for each pair of data and added together to form a sum. If the time limit in step 854 is exceeded, the error is reported back to an operator who can choose to accept the re-registration, continue for more iterations or permanently take the sensor off line. The remainder of the steps of FIG. 19 are performed as discussed above. Thus, the parameters are varied until the sum of the errors is below a termination threshold. At this point, the parameters of the matrix are considered temporary parameters. The steps of FIG. 19 are performed by control computer 606.

After the sum of the errors is below the threshold, the system determines which of the pairs of accumulated data have the largest error and those pairs of data are removed from further consideration. In one embodiment, ten percent of the pairs are removed. After the pairs are removed, the system again performs the process of FIG. 19, with the initial guess of parameters being the temporary parameters. The process again continues until the termination threshold is met. In one embodiment, the termination threshold is lowered for the second FIG. 19 process. In one embodiment, the re-registration process does not perform the second FIG. 19 process and what was called the temporary parameters are considered the final parameters.

After the termination threshold has been met, the matrix parameters are set and the sensor is considered to be re-registered. In step 896 the sensor is brought back on line. That is, the sensor data is now used to construct a line of position that will be used as part of the determination of finding a three dimensional location of the puck. The steps of FIG. 21 would primarily be performed on control computer 606 by software resident in the memory or in the hard disk associated with control computer 606. Note that while one sensor is being re-registered, some or all of the remaining sensors are still acquiring valid data and the system may continue to enhance the video presentation as discussed above.

In one embodiment, the process can be sped up by assuming that if a sensor is bumped, its pitch, roll or yaw may change but the x, y, z parameters will not change. Since the sensor is rigidly mounted, it is assumed that the sensor cannot be physically moved other than having its orientation changed. Thus, the re-registration process only solves for the sensor's orientation. Alternatively, if the sensor's orientation cannot be changed the system can assume that only x, y or z can change and, therefore, the re-registration process only solves for the sensor's location. Another alternative can include only solving for other sets of registration parameters.

An alternative embodiment for re-registering a sensor includes using beacons rather than using three dimensional locations calculated with data from other sensors. At the location of the live event, which in the above described embodiment is a hockey rink, beacons are placed within the field of view of the sensors. In the embodiment which uses infrared sensors, the beacons would be infrared emitters located throughout the hockey rink, preferably placed on or near the boards surrounding the hockey rink. It is preferable to have more than one beacon in the field of view of each sensor. The beacons are normally turned off and are remotely controlled. If it is determined that a particular sensor is mis-registered then the sensor may be taken off line. Data is accumulated (step 892) by turning on the beacons that are within the field of view of the particular sensor that is mis-registered and allowing the sensor to output cluster data for the beacons. Each sensor should see two to five beacons to ensure optimal performance. Since the exact three dimensional locations of the beacons can be measured prior to the live event, the system will re-register the sensor as discussed above using the beacons' three dimensional location and the data of the mis-registered sensor(s). An alternative includes using the beacons during registration and record the location of the beacon's clusters. During re-registration, the position of the new clusters in the mis-registered sensor (for the same beacons) can be compared to the position recorded during registration. The difference(s) in the two positions can be used as the evaluated error in the above described process or the difference(s) can be used to correspondingly alter the parameters.

An advantage of using beacons instead of the three dimensional locations determined from other sensors is that each sensor adds error to the calculation. Alternatively, the three dimensional location of the beacon can be measured accurately and, thus, not introduce as much error into the registration process. Additionally, when using beacons, there is no need to wait while valid data is being accumulated. On the other hand, adding beacons to the hockey rink could be logistically difficult and costly. For example, the wiring can be costly, time consuming and annoying to the fans at the arena.

In one alternative, the system includes the ability to reset a sensor's registration after re-registration. That is, after a sensor is re-registered, it is possible to reset the matrix J to the state prior to the process of FIG. 21.

Some live events have breaks. For example, a football game has time between plays, a baseball game has time between pitches, etc. These breaks are considered to be part of the live event and, usually, are not long enough to perform the entire registration process. The re-registration process described above can be performed (or partially performed) during these breaks.

The re-registration process can be used with sensors other than infrared sensors. In the case of using ranging radars it would not be necessary to re-register a sensor as a result of a small change in orientation. However, it would be necessary to re-register the sensor if it were moved. To compute the target's coordinates in three dimensions using ranging radars, it is necessary to have valid data from three radar units, the position of the sensors and some knowledge of the region of possible valid coordinates (in order to discard false results). When tracking a hockey puck, the system or the operator can determine that a given radar unit requires re-registration if data from the sensor consistently results in computed puck coordinates that are either above or below the ice (but not on the ice) when its data is taken with any other pair of sensors. Alternatively, if any three units consistently resulted in determinations of locations that were normally on the ice, or any four units resulted in data that is self consistent, the system (automatically) or operator could determine that another sensor was not properly registered if it was not in agreement with these sensors.

Once it has been determined that such a sensor is not properly registered, the operator or the system could cause the system to begin collecting data from the remaining (good) sensors until such time that a plurality of valid locations have been computed that are distributed over the effective region of coverage of the mis-registered sensor. At the same time, the system must collect range data from the mis-registered sensor. Once the necessary data has been collected, the system can compute the actual location of the mis-registered sensor based on the known distances (ranges it collected) from the known coordinates (locations computed from the remaining sensors).

I. Single Sensor System

The above described system determines the three dimensional location of the puck in order to enhance the video and/or audio for any broadcast camera whose pan/tilt/zoom and location are known. The inventors also contemplate a system that does not determine the three-dimensional location of the puck. Such a system could include one infrared sensor attached to or fixed near the broadcast camera. The video processor receives clusters from one infrared sensor and creates a line of position for one clusters. Various criteria can be used to determine the one cluster, for example, the brightest cluster. Since there are no clusters from other infrared sensors, a three dimensional location of the puck cannot be determined. Video processor 604 transforms the line of position from camera space to the three dimensional coordinate system of the arena. A point is selected along the line of position at a fixed distance from the camera, and that point is assumed to be the three dimensional location of the puck. Although the point is not the actual location, it will be in line with the actual location.

J. Alternative Use of Infrared Technology

The infrared technology disclosed above can be used in conjunction with the television presentation of sporting events other than hockey. For example, the infrared transmitter can be located within any suitable object at a sporting event as long as the transmitter does not interfere with the proper use of that object.

II. Radar With Active Transponder

An alternative to using infrared technology is radar. A radar based detection system relies on energy returned to the radar from an object of interest. In the hockey application, the energy scattered from a conventional puck can be lost in all the undesired back scattered energy (clutter) from the players, the rink, the building, etc. In order to make the puck stand out among the clutter, the radar signal is amplified with an electronic repeater. The puck's emission is made stronger and given a unique signature which makes it more easily detected.

Using radar with an active repeater to track a hockey puck has several desirable qualities. First, in addition to having inherently high ranging accuracy of a few inches or better, RF in the low microwave band efficiently passes through dielectric materials, such as hockey sticks and partially defracts around optically opaque objects such as ice skates, blades and human bodies. Thus, the puck is visible to the radar a substantial percentage of the time. Second, the repeater electronics are entirely confined within the rubber of the puck. Third, puck modulation can be channelized so that errant pucks lost in the crowd can be turned off to avoid interfering with the active game puck. Additionally, an active repeater is preferred over a passive reflecting hockey puck because it provides a much higher signal to noise ratio, provides false Doppler data (a motionless puck can be detected) and can be used to track more than one object.

A. Puck with Active Transponder

Figure 22:
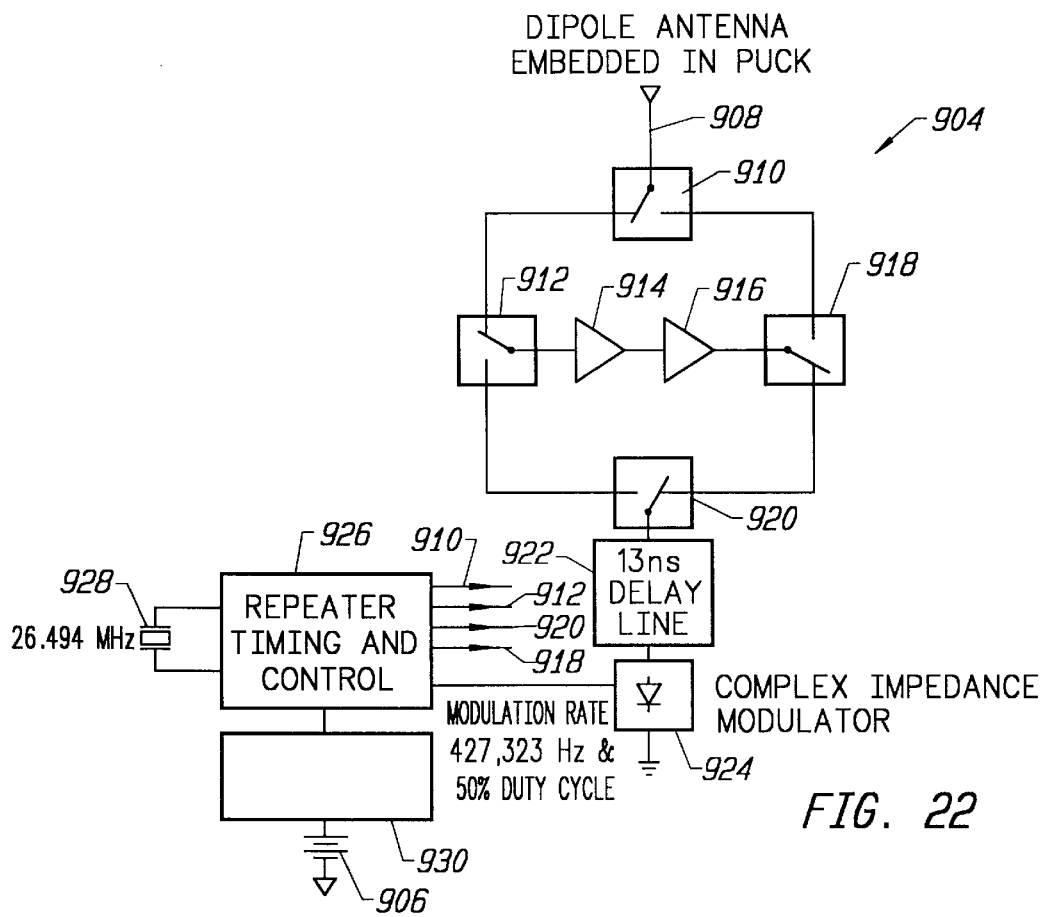
FIG. 22 is a block diagram of the electronics in an alternative embodiment hockey puck.

FIG. 22 is a block diagram of radar repeater 904 that can be located within a hockey puck or other object. A signal is received by dipole antenna 908 (which is completely embedded in the puck) and then passes through a switch and amplifier network. First, the received signal passes through switch 910 to switch 912 and then to amplifiers 914 and 916. After the amplifiers, the received signal passes through switch 918 followed by switch 920. After leaving the switch and amplifier network, the received signal fills up a 13 ns delay line 922, which, preferably, is a coaxial cable. Connected to delay line 922 is a complex impedance modulator 924 which modulates the radar signal by varying the reflection coefficient at the end of the cable at a rate of 427,323 Hz. Preferably, modulator 924 is a PIN diode which is turned off and on (modulated open and closed) causing the phase of the received RF signal to be alternately shifted between 0° and 180°. Modulator 924 receives a modulation signal of 427,323 Hz from repeater and timing and control circuit 926. Control circuit 926 also controls switches 910, 912, 918 and 920. Connected to control circuit 926 is crystal 928 for creating a clock signal oscillating at 26.494 MHZ.

The modulation performed by repeater 904 is biphase shift key modulation (BPSK), which creates two signals which have frequencies that vary from the incident signal by the modulation rate. The first signal has the same basic shape and amplitude as the incident signal, but with a frequency equal to the sum of the frequency of the incident signal and the modulation rate. In the preferred radar puck, the modulation rate is 427,323 Hz. The second signal has the same basic shape and amplitude as the incident signal, but with a frequency equal to the difference between the frequency of the incident signal and the modulation rate.

In the receive portion of the cycle, the switches are as drawn in FIG. 22. When delay line 922 is full, the repeater switches to transmit mode where control 926 reverses switches 910, 912, 918 and 920, and the signal flows out of the delay line, through switch 920 to switch 912, through amplifier 914 followed by amplifier 916, through switch 918 to switch 910 and finally to antenna 908. Repeater 904 switches between receive and transmit at a rate of 26.494 MHZ. One reason for the 13 ns delay in line 922 is to allow time to change the four switches.

The circuit of FIG. 22 has a shock activated switch and timer 930 which includes an RC decay timer which turns off the repeater after 45 seconds and a shock sensor which is used to turn on the circuit. Repeater 904 could have many (e.g. twenty) permanently programmed unique modulation channels. Thus, different pucks can modulate at different rates using control circuitry in timing and control circuit 926. Alternatively, an RF signal could be sent to the puck to indicate which modulation rate to use. Thus, the base radar unit could determine the signature of each puck. Either way, a puck could be readily identifiable and differentiated from other pucks and other sources of RF transmission.

In theory, a radar base unit sends out a signal which is received by the repeater inside the puck. The repeater amplifies, modulates and retransmits the signal back to the radar base unit. The radar base unit uses a difference in frequency to determine how far the puck is from the unit. The location of the puck in three dimensional space can be determined by using three radar base units simultaneously because the location of the puck can be determined from knowing how far it is from three known points. Alternatively, a radar base unit can use other data related to time of travel of the signal to determine distance.

One method for using a puck with a radar repeater is for the radar base unit to send out a frequency swept signal called a chirp which may, for example, be a sine wave with a constant amplitude and a frequency which is incrementally stepped over a given period of time. Preferably, a low power S-band radar is used to send signals to the puck in the microwave range. When the radar base unit receives the signal which has been sent by the puck, the radar base unit determines the difference between the frequency of the signal received from the puck and the frequency of the signal currently being sent as part of the chirp. The difference in frequencies can be used by techniques known in the art to determine the distance of the puck from the radar base unit.

Repeater 904 has the added feature that it modulates the radar signal, as described above, to create two signals which have frequencies that vary from the incident signal by the modulation rate. The modulated signal from the puck, when received by the radar base unit, would have the same frequency as a signal from an object much further than where the puck actually is. That is, a radar base unit would determine that the puck was at a phantom site five to ten times further than the actual location of the puck (e.g. that the puck was outside the arena). Since other objects actually at the phantom site would not be able to reflect a strong signal back to the radar base unit, the puck would stand out as the object giving the strongest return near the phantom location. A radar base unit could filter out signals received from objects not at the phantom location (e.g. most objects in the arena), allowing the puck to be located with minimal interference from any unwanted clutter.

Figure 23:
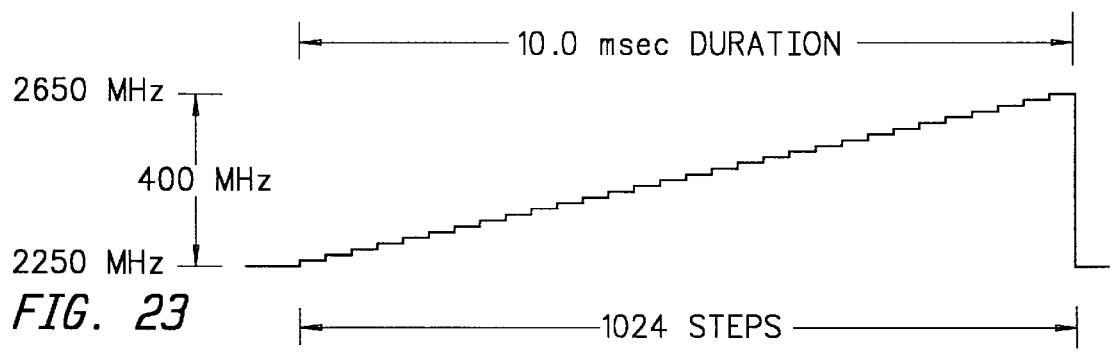
FIGS. 23–25 describe waveforms used in conjunction with the hockey puck of FIG. 22.
Figure 24:
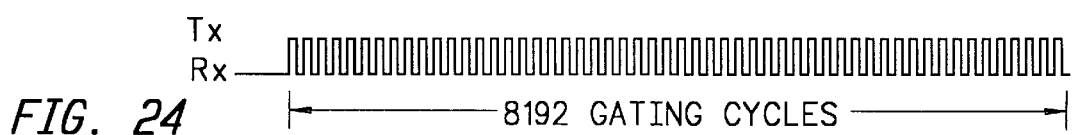
Figure 25:
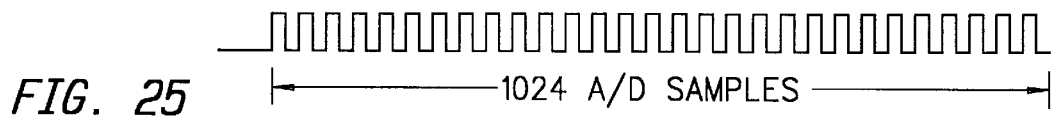

FIGS. 23, 24 and 25 describe an exemplar radar waveform that can be used with a puck having a radar repeater. The chirp, shown in FIG. 23, includes 1024 steps from 2.25 GHz to 2.65 GHz with a ten millisecond period. As described above, the radar base unit alternates between transmit and receive mode during the chirp. FIG. 24 shows the gating cycle between transmit and receive for the radar base unit which indicates that the radar base unit switches between transmit and receive modes at eight times the frequency stepping rate (819,200 Hz). As shown by FIG. 25, 1024 12-bit in-phase and quadrature sample pairs are taken for each 10 msec chirp.

B. Radar System

Many systems can be designed to utilize the advantages of a puck with a radar repeater. One exemplar radar base unit, shown in FIG. 26, uses a homodyne conversion architecture with a gated Frequency Modulated Continuous Wave (FMCW) format. Waveform gating allows the use of a single antenna while the FMCW format allows maximal RF efficiency with minimal information bandwidth. The radar operates with a peak power of one watt, a center frequency of 2.45 GHz, and a FMCW bandwidth of 400 MHZ.

Figure 26:
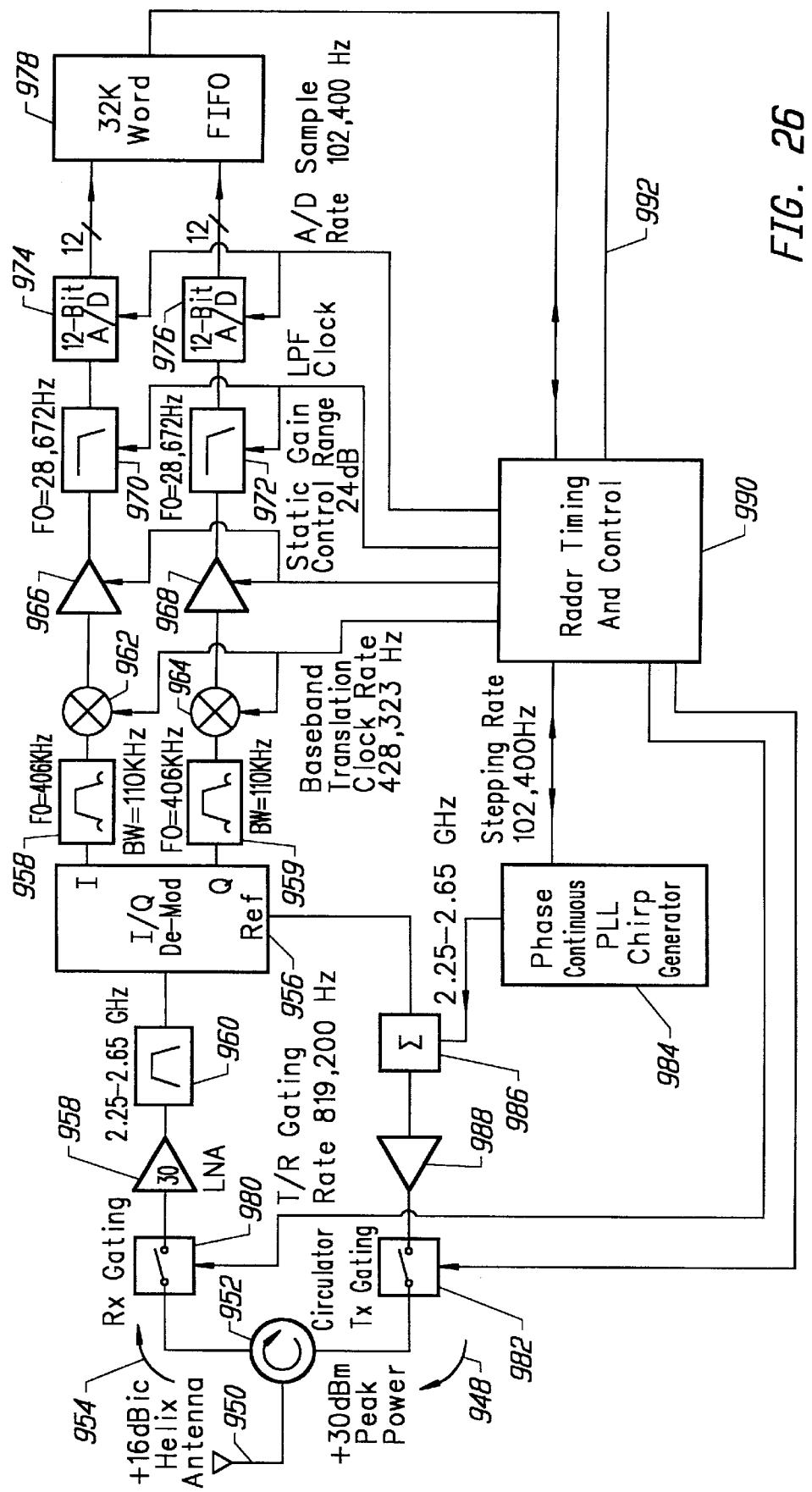
FIG. 26 is a block diagram of an exemplar radar base unit which can be used in conjunction with the hockey puck of FIG. 22

The radar base unit of FIG. 26 includes two signal paths: a transmit path 948 and a receive path 954. Gates 980 and 982 are used to open and close the transmission and reception paths which alternate. The transmit path will be discussed first. Under the control of radar timing and control circuit 990, a phase continuous phase locked loop chirp generator 984 creates the output waveform and counts in increments of frequency in 1024 steps from 2.25 GHz to 2.65 GHz. The waveform is sent to splitter 986 where substantially identical signals are sent to demodulator 956 (which is part of the receive path) and to amplifier 988 which amplifies the signal to one watt. After amplifier 988, the signal is applied to the +16 dBic helical radar antenna 950 through circulator 952.

A signal is received by antenna 950 and is passed through circulator 952 into a low noise preamplifier 958. The signal is then passed through filter 960 to remove unwanted energies, for example, cellular phone and satellite signals. The filtered signal is transmitted to demodulator 956, which creates in-phase (I) and quadrature (Q) outputs, both of which are filtered (958 and 959) to remove unwanted noise. The two signals are then sent to multipliers 962 and 964 which perform base band translation, at a clock rate of 428,323 Hz. The two signals are then transmitted to amplifiers 966 and 968, and sent through filters 970 and 972. The filtered signals are converted to digital signals in A/D converters 974 and 976, and stored in FIFO 978 before being transmitted to a computer (not shown) via line 992 for processing.

The computer triggers the radar base unit to transmit one chirp via communication with control 990 over line 992. After the chirp, the I/Q samples are read from the radar base unit and processed to extract the puck signal and then calculate its distance using techniques known in the art. In actual operation this process would happen at the video field rate of 60 Hz. Although the described radar repeater and radar base unit use a specific modulation scheme, the exact modulation scheme used is not critical to the inventive concept and many other suitable modulation schemes may be substituted.

The above described radar base unit is able to determine the distance from the base unit to the puck. Thus, a sphere can be drawn with the center of the sphere being the base unit and the radius of the sphere being the distance from the base unit to the puck. The puck's three-dimensional location can be determined using three base units. If spheres are drawn for each base unit, the three spheres will intersect at two points. One of these points is in the field of play and represents the three-dimensional position of the puck. The second point is an unrealistic location and is discarded. Once the puck's location is determined, a system can enhance the presentation of the puck in a manner similar to that described above.

The active radar system discussed above can be used with other objects in sporting events. For example, the radar repeater can be placed inside helmets, in various balls, in race cars, bicycles, etc.

III. Radar with a Passive Reflecting Target

Another embodiment of the present invention includes using the video enhancement system of the present invention with a radar base unit and a passive reflecting target. Similar to the radar with the active transponder, three or more radar base units are needed to determine the three dimensional location of the object. A radar base unit sends a radar signal to the object which reflects the signal back to the base unit. The object being tracked does not include an active transponder. Rather, the unmodified object itself passively reflects the radar signal or the object is modified to include a reflective element. One example of modifying an object includes adding a metal object or sputtering a film of metal throughout a surface. Another option includes adding a retro-reflector in the object. A retro-reflector returns energy directly back to the transmitter. One example of a retro-reflector is a trihedral, which is also known as a corner reflector. To use passive radar technology with the present invention, those skilled in the art could modify the system of FIG. 28 or use other systems known in the art. For example, U.S. Pat. No. 5,150,895 discloses a method of and a system for determining the position of a ball relative to a playing field using a signal reflecting off of a passive radar reflecting element. Other examples include using a corner reflector in a football, aluminum filings sputtered to the inside surface of a golf ball or metal foils attached to the inside surface of a tennis ball. The radar system can be used to track other objects including soccer balls, helmets, bicycles, cars, etc.

IV. Pattern Recognition

Another embodiment contemplates using a sensor employing optical recognition or pattern recognition. A pattern recognition system that determines the three dimensional location of an object can be used by a graphics center and production center in a manner similar to that described above to enhance a television presentation of the object.

The present invention can be used with many different live events. A live hockey game was used as an example and is not meant to limit the scope of the claims.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. For example, the inventors contemplate that the present invention can be used with many different suitable sensors, objects and graphics processing systems. It is intended that the scope of the invention be defined by the claims appended hereto.

What is claimed is:

1. A method of presenting a target during a live event, comprising the steps of:

determining whether a camera's view of said target is obstructed by a barrier; and editing, during said live event, a first video image captured by said camera to indicate a position of said target in said first video image if said camera's view of said target is obstructed by said barrier.

2. A method according to claim 1, wherein:

said step of determining whether a camera's view of said target is obstructed includes the step of determining whether said target is within said camera's field of .

3. A method according to claim 1 further including the step of:

determining said position of said target in said first video image using field of view data.

4. A method according to claim 1, wherein:

said step of editing said first video image adds an image of said target at said position of said target in said first video image.

5. A method according to claim 1 further including the steps of:

determining a three dimensional location of said target; and determining said position of said target in said first video image based on said three dimensional location of said target.

6. A method according to claim 1 wherein:

said step of editing includes keying a second video image with said first video image, said second video image depicts a representation of said target.

7. A method according to claim 1 wherein:

said step of editing includes combining a second image with said first video image, said second video image includes an image representing said target.

8. A method according to claim 7 wherein:

said second video image further includes a highlight.

9. A method according to claim 1 wherein:

said step of determining is performed automatically by a computer.

10. A method according to claim 1 wherein:

said target is mobile.

11. A method according to claim 1 wherein:

said target is a hockey puck.

12. A method according to claim 1 wherein:

said step of determining includes determining whether a sensor co-located with said camera can detect said target.

13. A method according to claim 1 wherein:

said barrier is a known fixed barrier.

14. A method according to claim 1 wherein:

said steps of determining and editing are performed in real time.

15. A method according to claim 1 further including the step of:

broadcasting said first video image after said step of editing, said steps of determining, editing and broadcasting are performed in real time during said live event.

16. A method according to claim 1 further including the step of:

adding, during said live event, a second video image to said first video image if said camera's view of said target is not obstructed by said barrier, said step of editing includes adding a third video image to said first video image if said camera's view of said target is obstructed by said barrier.

17. A method according to claim 1 wherein:

said first video image is a field of video.

18. A method according to claim 1 wherein:

said first video image is a frame of video.

19. An apparatus for enhancing a presentation of a target during a live event, comprising:

a camera;

a processor, in communication with said camera, said processor programmed to:

determine whether said camera's view of said target is obstructed by a barrier, and edit, during said live event, a first video image captured by said camera to indicate a position of said target in said first video image if said camera's view of said target is obstructed by said barrier.

20. An apparatus according to claim 19, further including:

at least one sensor, in communication with said processor, for detecting said target, said sensor being different from said camera.

21. An apparatus according to claim 20 further including:

one or more field of view sensors in communication with said processor capable of detecting said camera's field of view.

22. An apparatus according to claim 21 further including:

a keyer, in communication with said processor, to be used by said processor to edit said first video image.

23. An apparatus according to claim 21, wherein:

said processor further programmed to determine said target's three dimensional location using data from said sensor, and determine said position of said target in said first video image based on said three dimensional location of said target and data from said one or more field of view sensors.

24. An apparatus for enhancing a presentation of a target during a live event, comprising:

means for determining whether a camera's view of said target is obstructed by a barrier;

means for selectively enhancing a video signal from said camera if said camera's view of said target is obstructed by said barrier.

25. An apparatus according to claim 24 further including:

means for determining said target's position in a video image captured by said camera.

26. An apparatus according to claim 25 further including:

means for determining a three dimensional location of said target.

27. An apparatus according to claim 24 wherein:

said means for selectively enhancing adds an image representing said target to a video image captured by said camera.

28. A method of presenting a target during a live event, comprising the steps of:

determining if said target is visible to a camera, said step of determining includes symbolically constructing a line of position from a location at or near said camera to said target and determining whether said line of position passes through a barrier; and editing, during said live event, a first video image captured by said camera to indicate a position of said target in said first video image if said target is not visible to said camera.

29. A method of presenting a target during a live event, comprising the steps of:

determining if said target is visible to a camera, said step of determining includes the steps of symbolically constructing a line of position from a location at or near said camera to said target, symbolically constructing a surface representing a barrier free path and determining whether said line of position passes through said surface; and editing, during said live event, a first video image captured by said camera to indicate a position of said target in said first video image if said target is not visible to said camera.

30. One or more processor readable storage media having processor readable code embodied on said processor readable storage media, said processor readable code for programming one or more processors to perform a method comprising the steps of:

determining whether a camera's view of said target is obstructed by a barrier, and editing, during said live event, a first video image captured by said camera to indicate a position of said target in said first video image if said camera's view of said target is obstructed by said barrier.

31. One or more processor readable storage media according to claim 30 wherein said step of determining whether a camera's view of said target is obstructed includes the step of:

determining whether said target is within said camera's field of view.

32. One or more processor readable storage media according to claim 30 wherein:

said step of editing said first video image adds an image of said target at said position of said target in said first video image, said position of said target in said first image corresponds to a position of said target in said camera's field of view.

33. One or more processor readable storage media according to claim 30 wherein:

said step of determining whether a camera's view of said target is obstructed includes:

symbolically constructing a line of position from a location at or near said camera to said target; and determining whether said line of position passes through a barrier.

34. One or more processor readable storage media according to claim 33 wherein:

said barrier is a known fixed barrier.

35. One or more processor readable storage media according to claim 30 wherein:

said step of determining whether a camera's view of said target is obstructed includes:

symbolically constructing a line of position from a location at or near said camera to said target;

constructing a surface representing a barrier free path; and determining whether said line of position passes through said surface.

36. One or more processor readable storage media according to claim 30, wherein said method further includes the step of:

adding, during said live event, a second video image to said first video image if said camera's view of said target is not obstructed by said barrier, said step of editing includes adding a third video image to said first video image if said camera's view of said target is obstructed by said barrier.

* * * * *

UNITED STATES PATENT AND TRADEMARK OFFICE
CERTIFICATE OF CORRECTION

| | | |
|---|---|---|
| PATENT NO. | : 5,953,077 | Page 1 of 1 |
| DATED | : September 14, 1999 | |
| INVENTOR(S) | : Honey, et al. | |

It is certified that error appears in the above-identified patent and that said Letters Patent is hereby corrected as shown below:

<u>Claims,</u>
<u>Column 40,</u>
Line 10, after "field of" and before "." insert -- view --

<u>Column 41,</u>
Lines 23-24, after "processor" delete "capable of detecting said camera's field of view" and insert -- and said camera --

<u>Column 42,</u>
Line 17, after "barrier" and before "and" delete -- , -- and insert -- ; --
Line 17, after "and" and before "editing" insert a carriage return and tab (to start a new paragraph).

Signed and Sealed this

Twenty-third Day of October, 2001

*Attest:*

NICHOLAS P. GODICI
*Attesting Officer*   Acting Director of the United States Patent and Trademark Office